US012701175B2

(12) United States Patent
Rodrigo et al.

(10) Patent No.: US 12,701,175 B2
(45) Date of Patent: Aug. 4, 2026

(54) SERVICE REQUEST PROCESSING

(71) Applicant: Telefonaktiebolaget LM Ericsson (publ), Stockholm (SE)

(72) Inventors: Maria Cruz Bartolome Rodrigo, Torremocha de Jarama Madrid (ES); Songmao Li, Shanghai (CN); Yunjie Lu, Shanghai (CN); Xinyu Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/836,384

(22) PCT Filed: Mar. 2, 2023

(86) PCT No.: PCT/EP2023/055357
§ 371 (c)(1),
(2) Date: Aug. 7, 2024

(87) PCT Pub. No.: WO2023/166136
PCT Pub. Date: Sep. 7, 2023

(65) Prior Publication Data
US 2025/0150519 A1      May 8, 2025

(30) Foreign Application Priority Data
Mar. 2, 2022    (WO) ................ PCT/CN2022/078908

(51) Int. Cl.
*H04L 67/63* (2022.01)
(52) U.S. Cl.
CPC .................................... *H04L 67/63* (2022.05)
(58) Field of Classification Search
None
See application file for complete search history.

(56) References Cited

U.S. PATENT DOCUMENTS

2014/0095508 A1*   4/2014   Pytel ................. G06F 16/24539
                                                                  707/E17.014
2021/0111985 A1*   4/2021   Mahalank ............... H04L 67/56
(Continued)

FOREIGN PATENT DOCUMENTS

WO        2020260750 A1    12/2020
WO        2021083926 A1     5/2021
WO        2022022843 A1     2/2022

OTHER PUBLICATIONS

"3rd Generation Partnership Project; Technical Specification Group Core Network and Terminals; 5G System; Network Function Repository Services; Stage 3 (Release 17)", 3GPP TS 29.510 V17.4.0, Dec. 2021, 284 pages.
(Continued)

*Primary Examiner* — Raqiul A Choudhury
(74) *Attorney, Agent, or Firm* — Murphy, Bilak & Homiller, PLLC

(57) ABSTRACT

The present disclosure provides methods for processing a service request in a network comprising a set of Network Function (NF) nodes, and corresponding NF nodes. The method performed at a first NF node includes transmitting (S710) a request for the service to a Service Communication Proxy (SCP), the request comprising at least an indication indicating a required Application Program Interface (API) version for the service, wherein the requires API version is other than an API version included in a Resource Uniform Resource Identifier (URI) in the request. The present disclosure further discloses a corresponding method implemented at an SCP. The present disclosure further provides a corresponding computer readable medium.

17 Claims, 12 Drawing Sheets

(56) References Cited

U.S. PATENT DOCUMENTS

| 2021/0240554 | A1* | 8/2021 | Landais | ................. | H04L 67/30 |
| 2021/0409514 | A1* | 12/2021 | Westberg | ................ | H04L 67/06 |
| 2022/0264269 | A1* | 8/2022 | Akhavain Mohammadi | ............... | |
| | | | | | H04W 4/60 |
| 2023/0081395 | A1* | 3/2023 | Rojas Fonseca | ......... | G06F 8/63 |
| | | | | | 719/328 |

OTHER PUBLICATIONS

"3rd Generation Partnership Project; Technical Specification Group Core Network and Terminals; 5G System; Principles and Guidelines for Services Definition; Stage 3 (Release 17)", 3GPP TS 29.501 V17.4.1, Dec. 2021, 80 pages.

"3rd Generation Partnership Project; Technical Specification Group Core Network and Terminals; 5G System; Technical Realization of Service Based Architecture; Stage 3 (Release 17)", 3GPP TS 29.500 V17.4.0, Sep. 2021, 109 pages.

"3rd Generation Partnership Project; Technical Specification Group Services and System Aspects; System architecture for the 5G System (5GS); Stage 2 (Release 17)", 3GPP TS 23.501 V17.3.0, Dec. 2021, 559 pages.

* cited by examiner

700

S710

TRANSMIT A REQUEST FOR A SERVICE TO SCP

S720

RECEIVE FROM THE SCP A RESPONSE INCLUDING AN ERROR MESSAGE INDICATING THAT NO SECOND NF NODE PROVIDES THE REQUIRED API VERSION FOR THE SERVICE

S730

CONSTRUCT A DIFFERENT REQUEST FOR THE SERVICE

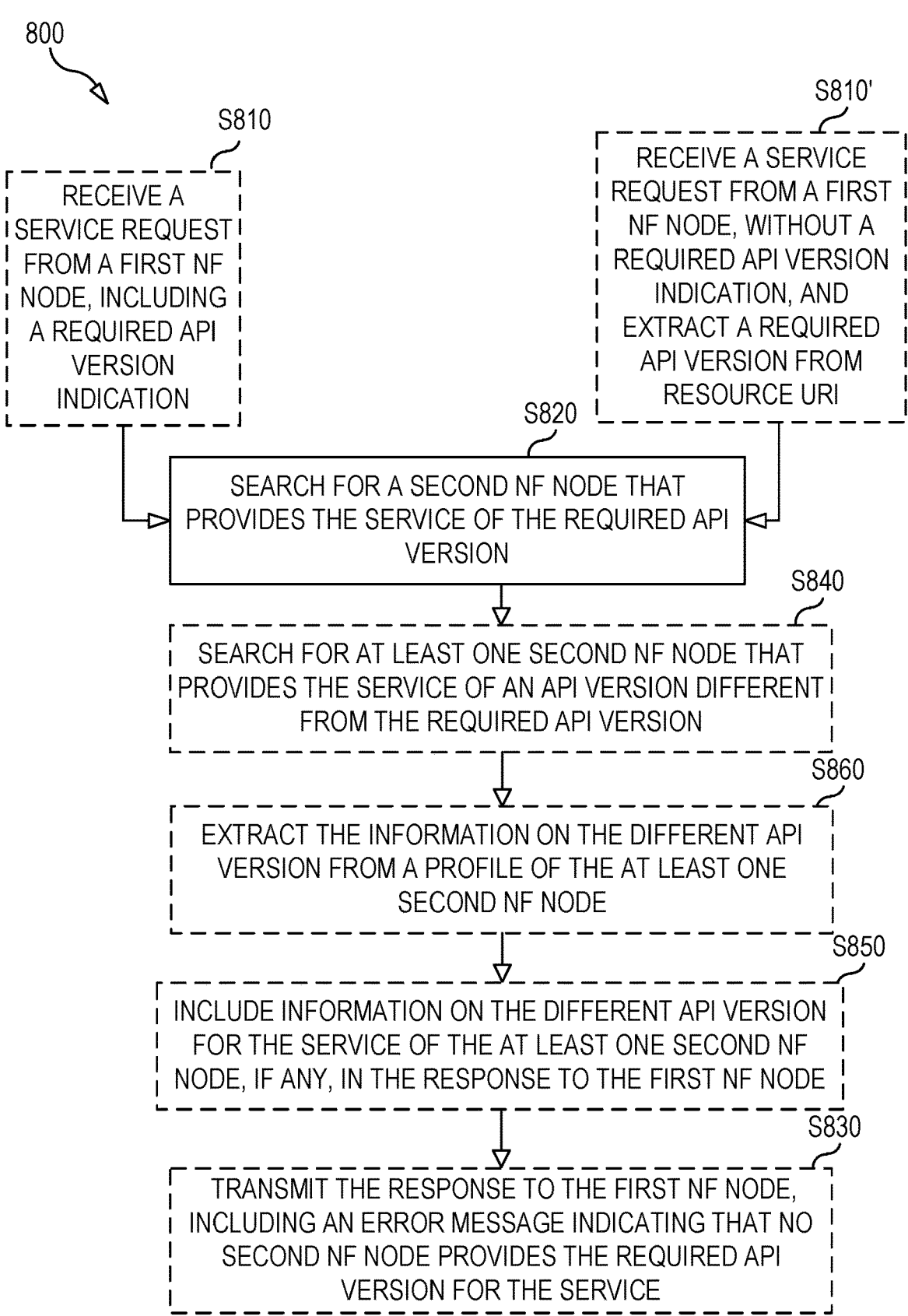

800

S810

RECEIVE A SERVICE REQUEST FROM A FIRST NF NODE, INCLUDING A REQUIRED API VERSION INDICATION

S810'

RECEIVE A SERVICE REQUEST FROM A FIRST NF NODE, WITHOUT A REQUIRED API VERSION INDICATION, AND EXTRACT A REQUIRED API VERSION FROM RESOURCE URI

S820

SEARCH FOR A SECOND NF NODE THAT PROVIDES THE SERVICE OF THE REQUIRED API VERSION

S840

SEARCH FOR AT LEAST ONE SECOND NF NODE THAT PROVIDES THE SERVICE OF AN API VERSION DIFFERENT FROM THE REQUIRED API VERSION

S860

EXTRACT THE INFORMATION ON THE DIFFERENT API VERSION FROM A PROFILE OF THE AT LEAST ONE SECOND NF NODE

S850

INCLUDE INFORMATION ON THE DIFFERENT API VERSION FOR THE SERVICE OF THE AT LEAST ONE SECOND NF NODE, IF ANY, IN THE RESPONSE TO THE FIRST NF NODE

S830

TRANSMIT THE RESPONSE TO THE FIRST NF NODE, INCLUDING AN ERROR MESSAGE INDICATING THAT NO SECOND NF NODE PROVIDES THE REQUIRED API VERSION FOR THE SERVICE

NF NODE
1200

1300

SCP 1400

1500

SERVICE REQUEST PROCESSING

TECHNICAL FIELD

The present disclosure generally relates to the technical field of telecommunication, and particularly to methods and Network Function (NF) nodes for processing a service request in a network comprising a set of NF nodes, and a corresponding computer readable medium.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Fifth Generation (5G) networks, a Network Slice is introduced as a logical network that provides specific network capabilities and network characteristics. An instance of a network slice (e.g. a network slice instance (NSI)) is a set of Network Function (NF) instances and the required resources (e.g., computing, storage, and networking resources) which form a deployed Network Slice. An NF is a third generation partnership project (3GPP) adopted or 3GPP defined processing function in a network, which has defined functional behavior and 3GPP defined interfaces. An NF can be implemented either as a network element on dedicated hardware, a software instance running on a dedicated hardware, or as a virtualized function instantiated on an appropriate platform, e.g., on a cloud infrastructure.

Among the NFs, a Service Communication Proxy (SCP) is defined, which provides centralized capabilities such as Service Based Interface (SBI) routing, NF discovery and selection, failover, message screening, etc. An SCP is used in indirect routing scenarios and one of the options to deploy SCP is model D, as described in 3GPP technical standard (TS) 23.501 (see, for example, annex E of 3GPP TS 23.501).

FIG. 1 shows a communication model for NF/NF services interaction in model D, as described in 3GPP TS 23.501.

As per the service definition in 3GPP 23.501, Model D can be defined as indirect communication with delegated discovery. That is, NF service consumers do not do (perform) any discovery or selection. The consumer adds any necessary discovery and selection parameters required to find a suitable producer to a service request. The SCP uses a request address and the discovery and selection parameters in a request message to route the request to a suitable producer instance. The SCP can perform discovery with a Network Repository Function (NRF) and obtain a discovery result.

In this model, the SCP discovers the target NF service producer. As per the service definition in 3GPP 23.501, if indirect communication with delegated discovery is used, the NF service consumer sends the request to the SCP and provides, within the service request to the SCP, the discovery and selection parameters necessary to discover and select an NF service producer.

Moreover, it is indicated in 3GPP TS 29.501 that an Application Program Interface (API) version is part of a resource Uniform Resource Identifier (URI). Clause 4.3.1.3 of 3GPP TS 29.501 relates to the visibility of the API version number fields. The API version can be indicated in the resource URI of every API, as described in clause 4.4.1 of 3GPP TS 29.501. The API version can be indicated as the concatenation of the letter "v" and the 1st field of the API version number. The other fields may not be included in the resource URI. Including these digits in the URI can force the NF service consumer to select a specific sub-version, at the risk of seeing the request rejected if the NF service provider does not support it, while the request may have been served by ignoring unknown elements.

Clause 4.4.1 of 3GPP TS 29.501 relates to a resource URI structure. Resources are either individual resources, or structured resources that can contain child resources. It is commonly recommended to design each resource following one of the archetypes provided in Annex C of 3GPP TS 29.501. A URI uniquely identifies a resource. In the 5G core (5GC) SBI APIs, when a resource URI is an absolute URI, its structure can be specified as follows:

{apiRoot}/<apiName>/<apiVersion>/<apiSpecificRe-
    sourceUriPart>

"apiName" defines the name of the API and "apiVersion" indicates the 1st Field (MAJOR) of the version of the API (see, for example, clause 4.3.1.3 and 4.4.1 of 3GPP TS 29.501). In clause 4.3.1.1 of 3GPP TS 29.501, an API version number format is also indicated. API version numbers can consist of at least 3 fields, following a MAJOR-.MINOR.PATCH pattern (for example, according to the Semantic Versioning Specification).

Two versions that differ in the major field or even in the minor field can have backward incompatible changes.

There is an issue when there are NFs deployed with different versions that are non-backward-compatible (NBC) or where there are NFs deployed with NBC versions among them. Even though NBC versions are usually minimized, it will be common that, for each API, NBC versions arise. There are already some cases such as, for example, a Policy Control Function (PCF) API.

With indirect communication with delegated discovery (model D), an NF service consumer does not perform NRF discovery to get (acquire) the profiles of NF service producers. Instead, this discovery is delegated to the SCP. When the NF service consumer receives an error response from the SCP for a service request, it does not know the failure reason, and thus cannot retry a service request by addressing the failure.

SUMMARY

At least some objects of the present disclosure are to provide technical solutions capable of allowing NF service consumers to be aware of failure reasons for a service request and retry a service request if it supports multiple NF service producer NBC API versions.

According to a first aspect of the present disclosure, there is provided a method performed at a first network function (NF) node for requesting a service with an SCP. The method comprises transmitting a request for the service to the SCP, the request comprising at least an indication indicating a required API version for the service, wherein the required API version is other than an API version included in a Resource Uniform Resource Identifier, URI, in the request.

In an exemplary embodiment, the method may further comprise receiving, from the SCP, a response including an error message indicating that no second NF node provides the required API version for the service.

In an exemplary embodiment, the response may further include information on an API version for the service of at least one second NF node that provides an API version different from the required API version for the service.

In an exemplary embodiment, the method may further include constructing a different request for the service by changing the required API version.

In an exemplary embodiment, constructing a different request for the service may be performed by taking the received information on the different API version into account.

In an exemplary embodiment, the required API version only indicates a major version.

According to a second aspect of the present disclosure, there is provided a method performed at an SCP. The method comprises receiving a request for a service from a first NF node, the request including an indication indicating a required API version for the service, wherein the required API version is other than an API version included in a Resource URI in the request; and searching for a second NF node that provides the service of the required API version.

In an exemplary embodiment, searching for a second NF node may comprise transmitting, to a Network Repository Function (NRF) an NF discovery request for discovering a second NF node that provides the required API version for the service; or searching in a cache of the SCP for the second NF node.

In an exemplary embodiment, the method may further comprise transmitting a response to the first NF node, including an error message indicating that no second NF node provides the required API version for the service.

In an exemplary embodiment, the method may further comprise searching for at least one second NF node that provides the service of an API version different from the required API version.

In an exemplary embodiment, the method may further comprise including information on the different API version for the service of the at least one second NF node, if any, in the response to the first NF node.

In an exemplary embodiment, the method may further comprise extracting the information on the different API version from a profile of the at least one second NF node.

In an exemplary embodiment, the required API version may only indicate a major version.

According to a third aspect of the present disclosure, there is provided a method performed at an SCP. The method comprises receiving a request for a service from a first NF node; extracting an API version from a Resource URI in the request, as a required API version for the service; and searching for a second NF node that provides the service of the required API version.

In an exemplary embodiment, searching for a second NF node may comprise transmitting, to an NRF an NF discovery request for discovering a second NF node that provides the required API version for the service; or searching in a cache of the SCP for the second NF node.

In an exemplary embodiment, the method may further comprise transmitting a response to the first NF node, including an error message indicating that no second NF node provides the required API version for the service.

In an exemplary embodiment, the method may further comprise searching for at least one second NF node that provides the service of an API version different from the required API version.

In an exemplary embodiment, the method may further comprise including information on the different API version for the service of the at least one second NF node, if any, in the response to the first NF node.

In an exemplary embodiment, the method may further comprise extracting the information on the different API version from a profile of the at least one second NF node.

According to a fourth aspect of the present disclosure, a first NF node is provided. The first NF node comprises at least one processor configured to operate in accordance with the above-described first aspect. In some embodiments, the first NF node may comprise a communication interface arranged for communication. In some embodiments, the first NF node may comprise a memory comprising instructions which, when executed by the at least one processor, cause the first NF node to perform the above-described first aspect.

According to a fifth aspect of the present disclosure, an SCP is provided. The SCP comprises at least one processor configured to operate in accordance with the above-described second aspect and/or third aspect. In some embodiments, the SCP may comprise a communication interface arranged for communication. In some embodiments, the SCP may comprise a memory comprising instructions which, when executed by the at least one processor, cause the SCP to perform the above-described second aspect and/or third aspect.

According to a sixth aspect of the present disclosure, there is provided a computer program comprising instructions which, when executed by at least one processor, cause the at least one processor to perform the method according to the above-described first aspect, second aspect, and/or third aspect.

According to a seventh aspect of the present disclosure, there is provided a carrier containing the computer program discussed above. In some embodiments, the carrier may be one of an electronic signal, optical signal, radio signal, or computer readable storage medium.

According to an eighth aspect of the present disclosure, there is provided a computer readable storage medium having computer program instructions stored thereon, the computer program instructions, when executed by at least one processor, causing the processor to perform the method according to the above-described first aspect, second aspect, and/or third aspect.

According to the above technical solutions of the present disclosure, the NF service consumer may know the failure reason when receiving an error response for a service request. Thus, the SCP may provide additional API versions to the NF service consumer in case there is no NF service producer that provides the required version, the NF service consumer may retry a service request by using the additional API versions if supported. Therefore, there is provided herein a solution to support multiple NF service producer NBC API versions with indirect communication, e.g. with model D.

BRIEF DESCRIPTION OF THE DRAWINGS

The objects, advantages and characteristics of the present disclosure will be more apparent, according to descriptions of preferred embodiments in connection with the drawings, in which:

FIG. 7 illustratively shows a flowchart of a method for processing a service request according to an exemplary embodiment of the present disclosure;

FIG. 8 shows an exemplifying signaling diagram illustrating details of the methods schematically illustrated in FIGS. 6 and 7;

Figure 1:
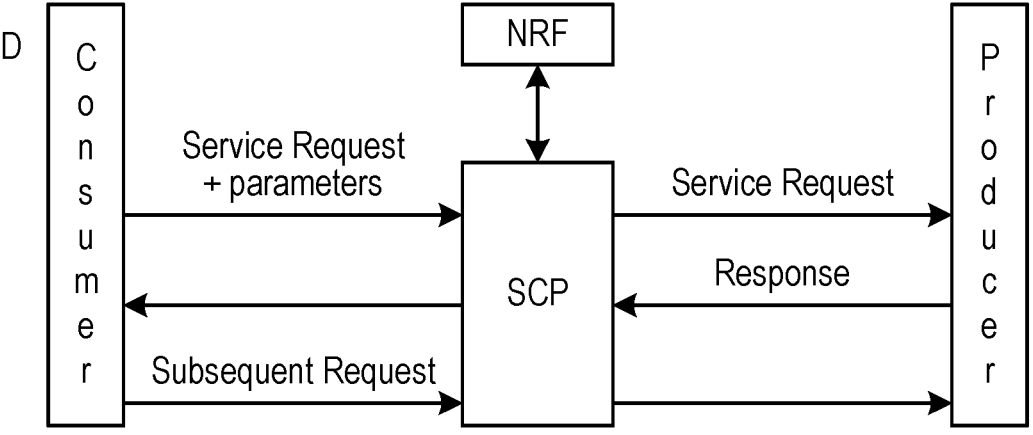
FIG. 1 shows a communication model for NF/NF services interaction in model D.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Additional information may also be found in references as follows:

1) 3GPP TS 23.501, V17.3.0 (2021 December),
2) 3GPP TS 29.501, V17.4.1 (2021 December), and
3) 3GPP TS 29.510, V17.4.0 (2021 December).

References in this specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of the person skilled in the art to affect such feature, structure, or characteristic in connection with other embodiments whether or not explicitly described.

The terminology used herein is for the purpose of describing particular embodiments only and is not intended to be limiting of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), Long Term Evolution (LTE), New Radio (NR) and other networks developed in the future. The terms "network" and "system" are sometimes used interchangeably. For illustration only, certain aspects of the techniques are described below for the $5^{th}$ generation of wireless communication network. However, it will be appreciated by the person skilled in the art that the techniques described herein may also be used for other wireless networks such as LTE and corresponding radio technologies mentioned herein as well as wireless networks and radio technologies proposed in the future.

As used herein, the term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but is not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably.

Figure 2:
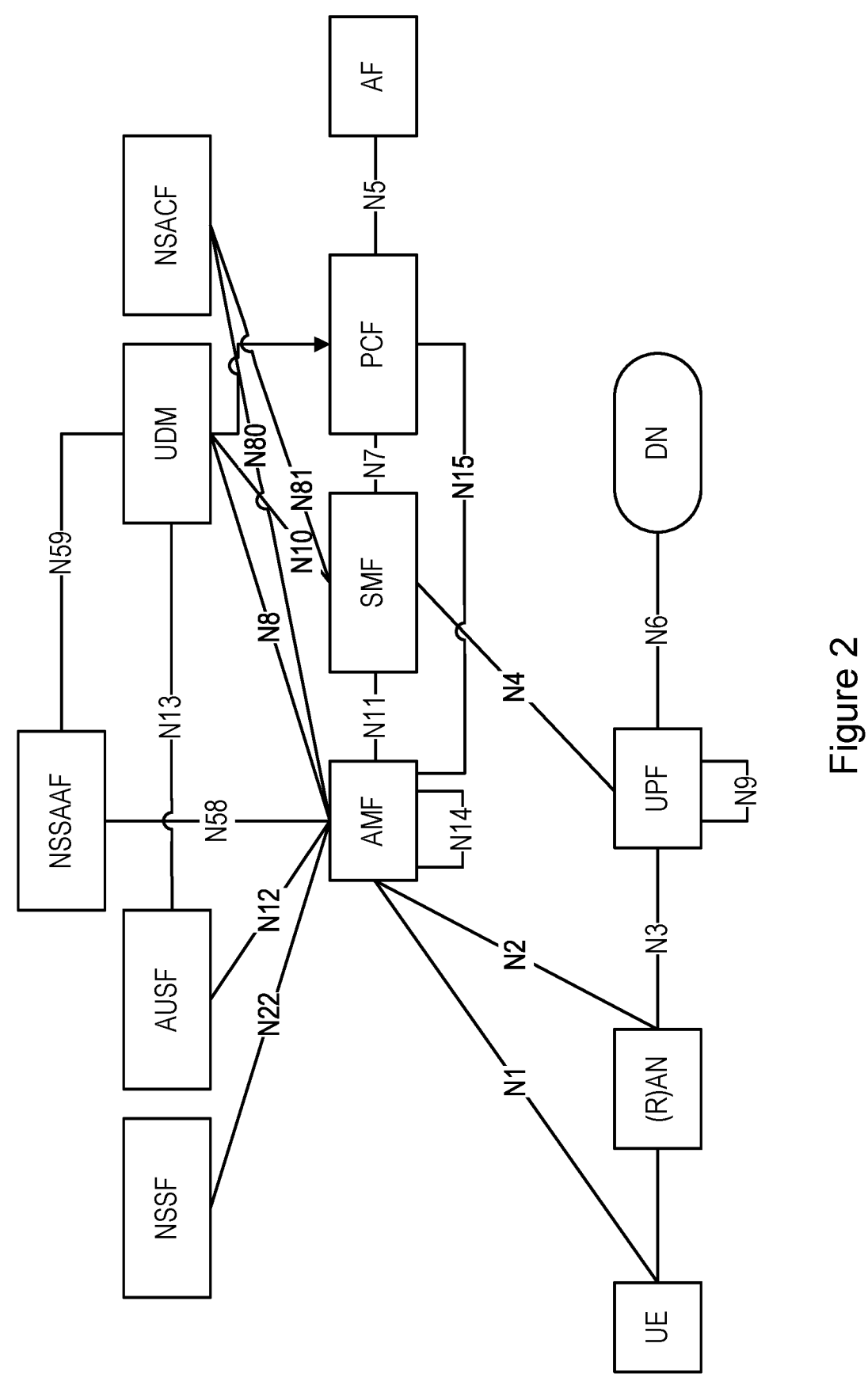
FIG. 2 illustrates a wireless communication system represented as a 5G network architecture composed of core NFs.

FIG. 2 illustrates a wireless communication system represented as a 5G network architecture composed of core NFs, where interaction between any two NFs is represented by a point-to-point reference point/interface.

Seen from the access side, the 5G network architecture shown in FIG. 2 comprises a plurality of User Equipment (UEs) connected to either a Radio Access Network (RAN) or an Access Network (AN) directly, as well as an Access and Mobility Management Function (AMF) indirectly, for example, via the RAN or AN. Typically, the R(AN) comprises base stations, e.g. such as evolved Node Bs (eNBs), or 5G base stations (gNBs), or similar. Seen from the core network side, the 5G core NFs shown in FIG. 2 include a Network Slice-specific and Stand-alone Non-Public Network (SNPN) Authentication and Authorization Function (NSSAAF), a Network Slice Selection Function (NSSF), an Authentication Server Function (AUSF), a Unified Data Management (UDM), a Network Slice Admission Control Function (NSACF), an Access and Mobility Management Function (AMF), a Session Management Function (SMF), a Policy Control Function (PCF), an Application Function (AF), and a User Plane Function (UPF).

Reference point representations of the 5G network architecture are used to develop detailed call flows in the normative standardization. The N1 reference point is defined to carry signaling between the UE and the AMF. The reference points for connecting between the AN and the AMF, and between the AN and the UPF, are defined as N2 and N3, respectively. There is a reference point, N11, between the AMF and the SMF, which implies that the SMF is at least partly controlled by the AMF. N4 is used by the SMF and the UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and the SMF, respectively. N12 is required for the AMF to perform authentication of the UE. N8 and N10 are defined because the subscription data of the UE is required for the AMF and the SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and the SMF are independent functions in the control plane. Separated, the AMF and the SMF allow independent evolution and scaling. Other control plane functions like the PCF and the AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
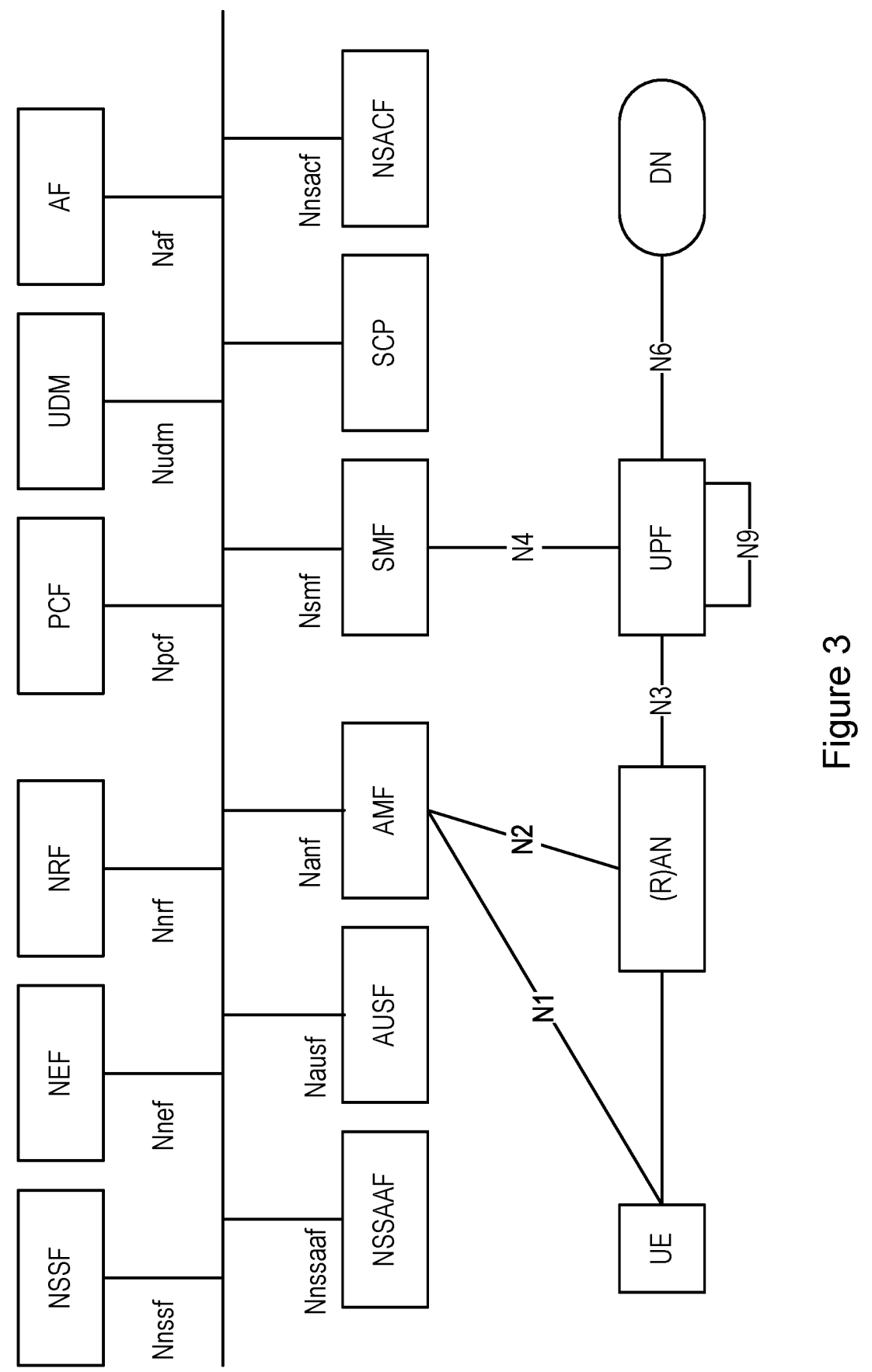
FIG. 3 illustrates a 5G network architecture using service-based interfaces between the NFs in a control plane, instead of point-to-point reference points/interfaces as used in the 5G network architecture illustrated in FIG. 2.

FIG. 3 illustrates a 5G network architecture using service-based interfaces between the NFs in the control plane, instead of the point-to-point reference points/interfaces used in the 5G network architecture as illustrated in FIG. 2. However, the NFs described above with reference to FIG. 2 correspond to the NFs shown in FIG. 3. The service(s) etc. that an NF provides to other authorized NFs can be exposed to the authorized NFs through the service-based interface(s). In FIG. 3 the service-based interfaces are indicated by the letter "N" followed by the name of the NF, e.g. Namf for the service-based interface of the AMF, and Nsmf for the service-based interface of the SMF etc.

Some properties of the NFs shown in FIGS. 2-3 may be described in the following manner. The AMF provides UE-based authentication, authorization, mobility management, etc. A UE using multiple access technologies is basically connected to a single AMF because the AMF is independent of the access technologies. The SMF is responsible for session management and allocates internet protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and the SMF operate properly. The AUSF supports authentication function for UEs, or similar, and thus stores data for authentication of UEs, or similar, while the UDM stores subscription data of the UE. The Data Network (DN), not part of the 5G core network, provides Internet access or operator services and similar.

An NF may be implemented either as a network element on a dedicated hardware, as a software instance running on a generic hardware, or as a virtualized function instantiated on an appropriate platform, e.g., a cloud infrastructure. An SCP can be defined as a node that is configured to operate as an SCP between NF nodes, e.g. the first NF node (e.g. an NF service consumer node) referred to herein and any one or more second NF nodes (e.g. any one or more NF service producer nodes) referred to herein.

If an SCP is deployed, it can be used for indirect communication between NFs and NF services. The SCP does not expose services itself. If indirect communication with delegated discovery ("model D") is used, the NF service consumer sends the service request to the SCP and provides, within the service request to the SCP, the discovery and selection parameters necessary to discover and select an NF service producer. Thus, in model D, the SCP is operable or configured to perform (or is responsible for performing) NF discovery. The discovery can be referred to as delegated discovery as it can be delegated to the SCP, e.g. by the NF service consumer. For example, in model D, the NF service consumer can send, to the SCP, one or more discovery parameters (or factors) required to find one or more (suitable) NF service producer nodes. The SOP may discover one or more NF service producer nodes (e.g. via an NRF or from its own cache) by using the received one or more discovery parameters.

There is an issue when there are NF service producers deployed with different versions that are non-backward-compatible (NBC) or where there are NFs deployed with NBC versions among them.

Version numbering defines so called minor and major version, e.g. 1.2.0, where 1 is the major version, and 2 is the minor one. A different major version can have NBC changes, but this may happen as well for minor versions.

In NRF discovery, it is possible to include a query parameter "preferred-supported-features". This query parameter is defined in 3GPP TS 29.510 (see Table 1 below which corresponds to Table 6.2.3.2.3.1-1 of 3GPP TS 29.510).

TABLE 1

| URI query parameters supported by a GET method on this resource | | | | | |
| --- | --- | --- | --- | --- | --- |
| Name | Data type | P | Cardinality | Description | Applicability |
| . . . | . . . | . . . . . . . | | . . . | . . . |
| preferred -api- versions | map(string) | O | 1 . . . N | When present, this information element (IE) indicates a preferred API version of services that are supported by target NF instances. The key of the map is the ServiceName (see clause 6.1.6.3.11 of 3GPP TS 29.510) for which the preferred API version is indicated. Each element carries the API Version Indication for the service indicated by the key. The NRF may return additional NFs in the response not matching the preferred API versions, e.g. if no NF profile is found matching the preferred-api-versions. An API Version Indication is a string formatted as {operator} + {API Version}. The following operators shall be supported: "=" match a version equals to the version value indicated. ">" match any version greater than the version value indicated ">=" match any version greater than or equal to the version value indicated "<""" match any version less than the version value indicated "<=" match any version less than or equal to the version value indicated "^" match any version compatible with the version indicated, i.e. any version with the same major version as the version indicated. Precedence between versions is identified by comparing Major, Minor, and Patch version fields numerically, from left to right. If no operator or an unknown operator is provided in API Version Indication, "=" operator is applied. Example of API Version Indication: Case1: "=1.2.4.operator-ext" or "1.2.4.operator-ext" means matching the service with API version "1.2.4.operator-ext" Case2: ">1.2.4" means matching the service with API versions greater than "1.2.4" Case3: "^2.3.0" or "^2" means matching the service with all API versions with major version "2". | Query- Params-Ext2 |

However, the (discovery) results may include "non-pre-ferred api versions". If only "preferred -api-versions" are included in the (discovery) results, it can be indicated that the result includes the attribute "preferred Search", as described in clause 6.2.6.2.2 of 3GPP TS 29.510 (see Table 2 below, which corresponds to Table 6.2.6.2.2-1 of 3GPP TS 29.510).

TABLE 2

| Definition of type SearchResult | | | | |
|---|---|---|---|---|
| Attribute name | Data type | P | Cardinality | Description |
| . . . | . . . | . . . | . . . | . . . |
| preferredSearch | PreferredSearch | C | 0 . . . 1 | This IE shall be present to indicate whether all the returned NFProfiles match the preferred query parameters, if the discovery request contain any of the query parameter defined in the PreferredSearch data type. |

Where PreferredSearch can be as follows (see Table 3 below, which corresponds to Table 6.2.6.2.6-1 of 3GPP TS 29.510):

TABLE 3

| Definition of type PreferredSearch | | | | |
|---|---|---|---|---|
| Attribute name | Data type | P | Cardinality | Description |
| . . . | | | | |
| preferredApiVersionsMatchInd | boolean | O | 0 . . . 1 | Indicates whether the search result includes at least one NF Profile that matches all the preferred API versions indicated in the query parameter preferred-api-versions. true: Match false: Not Match |
| otherApiVersionsInd | boolean | O | 0 . . . 1 | This IE may be present if the preferred-api-versions query parameter is provided in the discovery request. When present, this IE indicates whether there is at least one NF Profile with other API versions, i.e. that does not match all the preferred API versions indicated in the preferred-api-versions, returned in the response or not. true: Returned false: Not returned |

Then, even with this information, a client is only able to know whether only preferred-api-versions are included in NF service producer profiles provided, or if other non-preferred API-versions may be included as well. But, it is up to NRF implementation in fact to provide NF service producer profiles with a non-preferred-apiversion.

With this information, if the client is an NF service consumer, unless it is indicated that only NF service producers with preferred-api-versions are provided, the NF service consumer needs to check the api-version in the NF service producer profiles to select the preferred api-version, among the ones provided. Then, the NF service consumer may encode a JavaScript Object Notation (JSON) body in the service request according to the version chosen.

With indirect communication with delegated discovery (model D), the NF service consumer does not perform NRF discovery to get the NF service producer profiles. Instead, this is delegated to the SCP. Some of the following description and figures describe the issues in this case.

There are some variants of existing behaviour, which depend on if a preferred-api-versions query parameter is used and if the NF service producer supports the major versions indicated by the resource URI.

Figure 4:
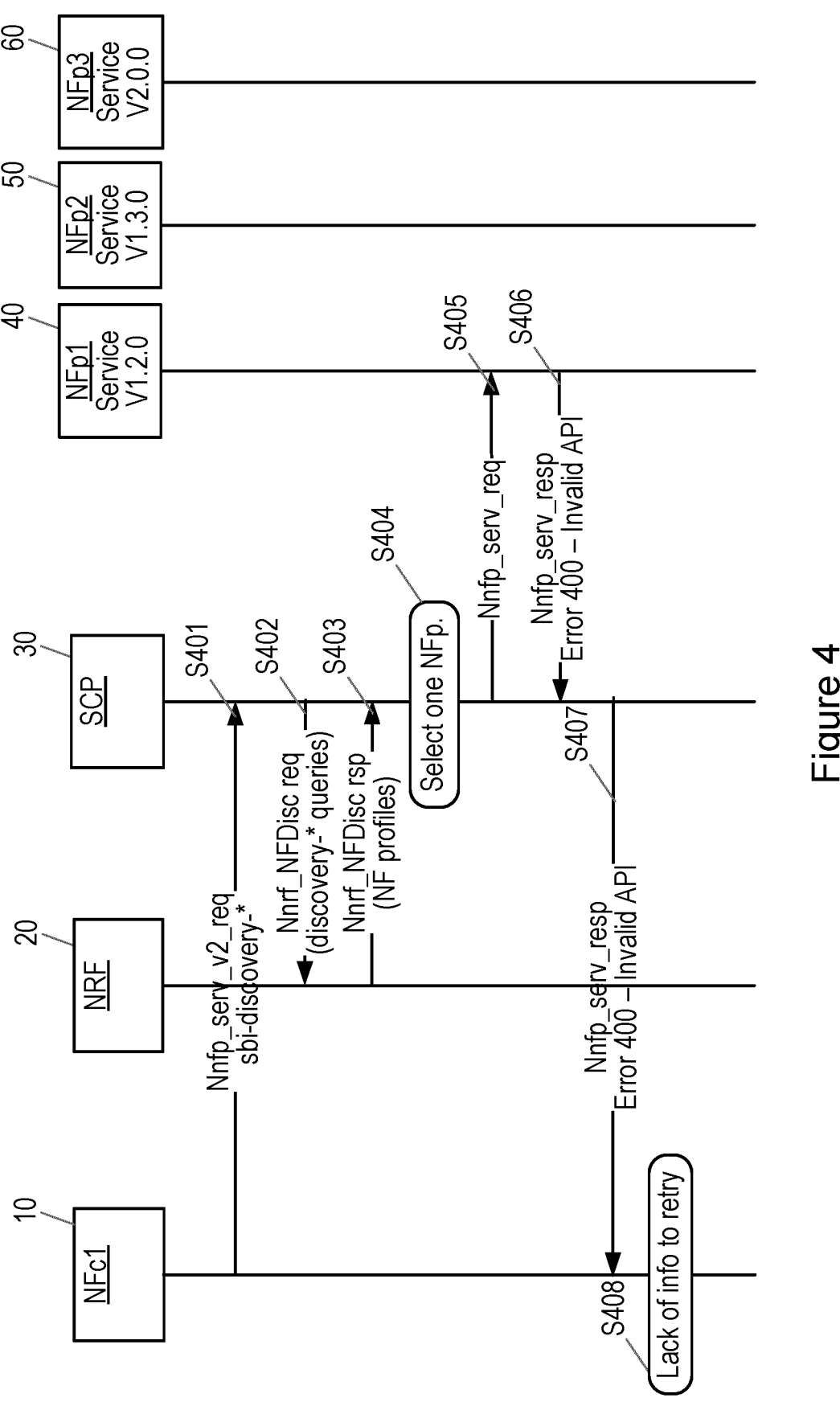
FIG. 4 shows an exemplifying signaling diagram illustrating details of a flow where an NF node makes a request for a service in model D, in which a preferred-api-versions query parameter is not used.

FIG. 4 shows an exemplifying signaling diagram illustrating details of a flow where an NF node, (e.g., an NF service consumer) requests a service in model D, in which a preferred-api-versions query parameter is not used.

The example shown in FIG. 4 involves an NFc1 10, which is an NF service consumer, an NRF 20, an SCP 30, and NF service producers 40, 50, 60 (i.e. NFp1 40, NFp2 50, and NFp3 60). In the example illustrated in FIG. 4, NFp1 40 provides v1.2.0 of the service, NFp2 50 provides v1.3.0 of the service, and NFp3 60 provides v2.0.0 of the service. FIG. 4 is only an example, and it is known that the number of the NF service producers and the services provided by the NF service producers are shown only for illustration, and that other numbers of NF service producers and/or services is possible.

When a service consumer entity, for example NFc1 10, requests the SCP 30 for a service, it may transmit a service request (i.e. a request for a service), e.g. "Nnfp_serv_v2_req", to the SCP 30 in step S401 of FIG. 4. Thus, the SCP 30 can receive the service request from the NFc1 10. The API-version is included in the ResourceURI as standardized, e.g. v2 in the example illustrated in FIG. 4. In the example illustrated in FIG. 4, sbi-discovery-* does not include sbi-discovery-preferred-apiversions.

In step S402 of FIG. 4, the SCP 30 may transmit a discovery request, e.g. "Nnrf_NFDisc req", to the NRF 20, to find the corresponding NF service producer profiles. Thus, the NRF 20 can receive the discovery request from the SCP 30.

In step S403 of FIG. 4, the NRF 20 can provide all available NF service producer instances 40, 50, 60, i.e., NFp1 40, NFp2 50 and NFp3 60. Thus, the SCP 30 can receive all available NF service producer instances 40, 50, 60 (NRF discovered results) from the NRF 20.

In step S404 of FIG. 4, the SCP 30 may select one NF service producer 40 from NRF discovered results. The SCP 30 may select an NF service producer that does not support the required version, e.g. NFp1 40 in the example.

In step S405 of FIG. 4, the SCP 30 may transmit the service request to the selected NF service producer 40, i.e., NFp1 40. Thus, NFp1 40 can receive the service request from the SCP 30.

In the example illustrated in FIG. 4, NFp1 40 is unable to process the request, since this version of the API is not supported. Accordingly, in step S406 of FIG. 4, the SCP 30 can receive a response from NFp1 40, including an error.

The SCP 30 is unable to solve the situation, since the resource URI is constructed based on API-version v2. The SCP 30 cannot modify the resource URI. So, the SCP 30 may forward the error response to the NFc1 in step S407 of FIG. 4.

NFc1 10 can thus receive the error response from the SCP 30, but has no knowledge of the information to retry. Accordingly, NFc1 10 is unable to retry or to react upon this error by any means. In the example illustrated in FIG. 4, since the NF service consumer (i.e. NFc1 10) in model D does not perform NRF discovery, the request sent to the SCP 30 fails.

Figure 5:
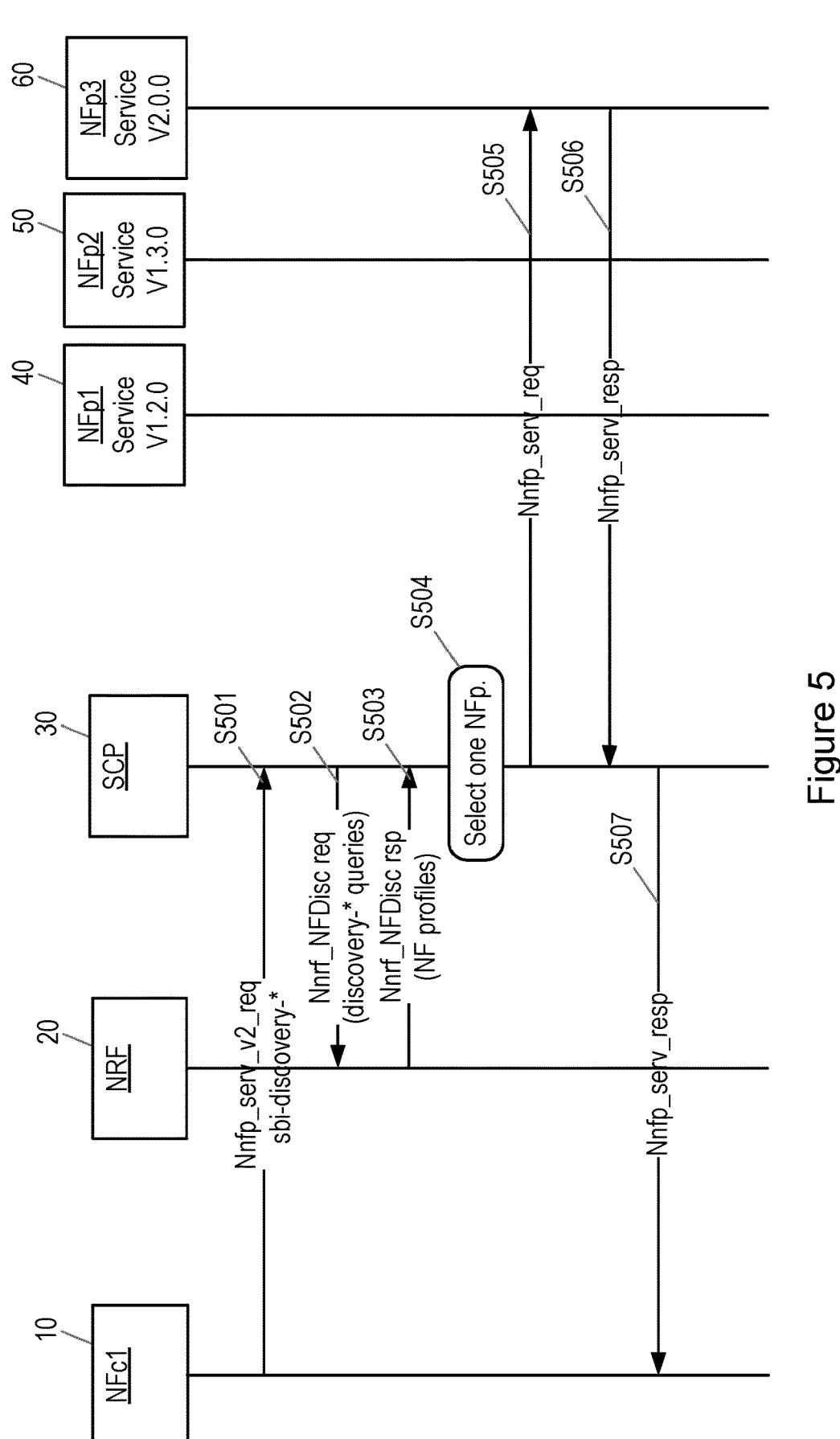
FIG. 5 shows an exemplifying signaling diagram illustrating details of a flow where an NF node makes a request for a service in model D, in which a preferred-api-versions query parameter is used and there is an available NF service producer supporting major versions indicated by a resource URI.

FIG. 5 shows an exemplifying signaling diagram illustrating details of a flow where an NF node, (e.g., an NF service consumer) requests a service in model D, in which preferred-api-versions query parameter is used and there is an available NF service producer supporting the major versions indicated by the resource URI.

The example shown in FIG. 5 involves an NFc1 10, which is an NF service consumer, an NRF 20, an SCP 30, and NF service producers 40, 50, 60 (i.e. NFp1 40, NFp2 50, and NFp3 60). In the example illustrated in FIG. 5, NFp1 40 provides v1.2.0 of the service, NFp2 50 provides v1.3.0 of the service, and NFp3 60 provides v2.0.0 of the service. FIG. 5 is only an example, and it is known that the number of the NF service producers and the services provided by the NF service producers are shown only for illustration, and that other numbers of NF service producers and/or services is possible.

When a service consumer entity, for example NFc1 10, requests the SCP 30 for a service, it may transmit a service request (i.e. a request for a service), e.g. "Nnfp_serv_v2_req", to the SCP 30 in step S501 of FIG. 5. Thus, the SCP 30 can receive the service request from the NFc1 10. The API-version is included in the ResourceURI as standardized, e.g. v2 in the example illustrated in FIG. 5.

In the example illustrated in FIG. 5, sbi-discovery-* includes an sbi-discovery-preferred-apiversions header, e.g. ^2, which means matching the service with all API versions with major version "2".

In step S502 of FIG. 5, the SCP 30 may transmit a discovery request, e.g. "Nnrf_NFDisc req", to the NRF 20, to find the corresponding NF service producer profiles. Thus, the NRF 20 can receive the discovery request from the SCP 30. The "sbi-discovery-preferred-apiversions" header can be included in the discovery request as a query parameter for the NRF discovery.

In step S503 of FIG. 5, the NRF 20 may provide a discovery response to the SCP 30. Thus, the SCP 30 can receive the discovery response from the NRF 20. For example, the NRF 20 may provide only an exact match for API-version with major version "2", or include other profiles as well. This is unknown.

In step S504 of FIG. 5, the SCP 30 may select one NF service producer from NRF discovered results. There may be different possible variants of behaviour depending on the NRF and SCP behaviour, for example:

Variant a): Assume other non-preferred-apiversion profiles are included as well as discovery results, and this is indicated to the SCP 30. Then, the SCP 30 may choose any random profile from the results, e.g. NFp1 40, the same flow as in FIG. 4. In this case, steps S405 to S408 of FIG. 4 may be reproduced.

Variant b): Only exact match results are provided from the NRF 20. In this case, only NFp3 60 is provided from the NRF 20 (since NFp3 supports the required version (i.e. major version "2")). The SCP 30 may then select NFp3 60.

In step S505 of FIG. 5, the SCP 30 can transmit the service request to the selected NF service producer, i.e., NFp3 60. Thus, the NFp3 60 can receive the service request from the SCP 30.

In the example illustrated in FIG. 5, NFp3 60 is able to process the request. Accordingly, in step S506 of FIG. 5, the SCP 30 can receive a service response from NFp3 60, indicating successful processing of the service request.

The SCP 30 can forward the successful service response to the NFc1 10, in step S507 of FIG. 5. Thus, the NFc1 10 can receive the successful service response from the SCP 30.

Figure 6:
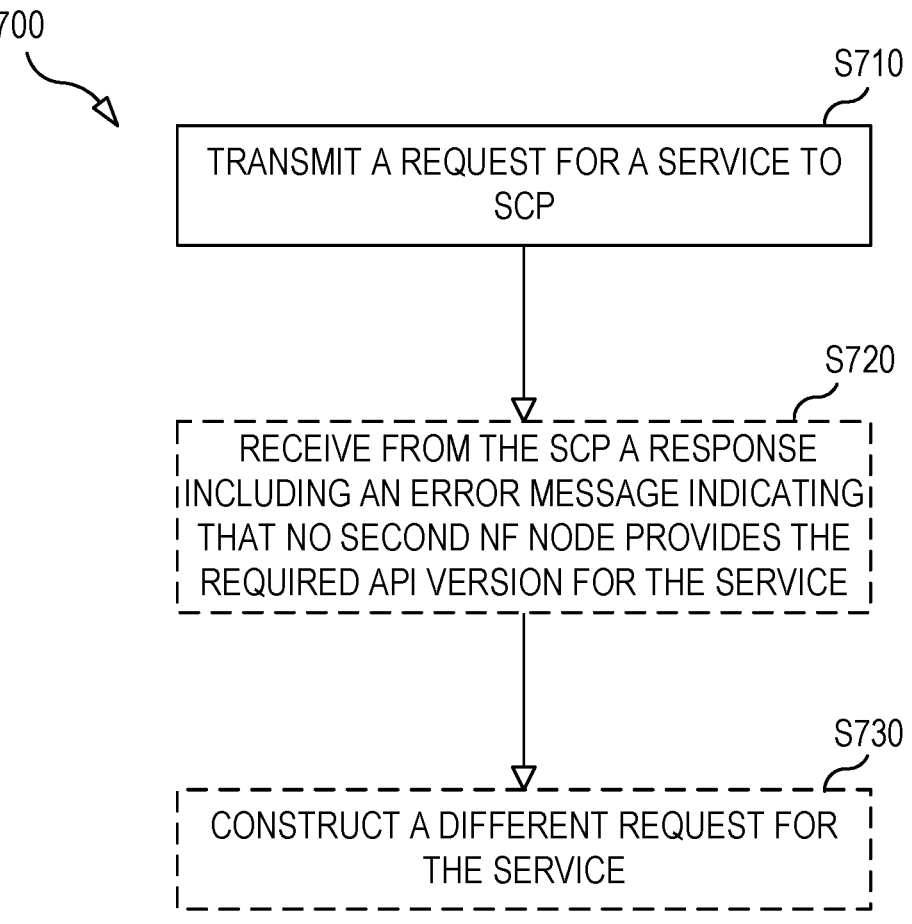
FIG. 6 illustratively shows a flowchart of a method for requesting a service with an SCP in model D according to an exemplary embodiment of the present disclosure.

FIG. 6 illustratively shows a flowchart of a method 700 for requesting a service with an SCP in model D, according to an exemplary embodiment of the present disclosure. In an embodiment, the method 700 may be performed at a first Network Function (NF) node. The first NF node may be, for example, an NF service consumer.

As shown in FIG. 6, the method 700 may include steps S710 to S730.

In step S710 of FIG. 6, the first NF node transmits a request for the service to the SCP. The request comprises at least an indication indicating a required API version for the service (e.g. an API version for the service that is required to the first NF node). The indication (or the required API version indicated by the indication) is other than an API version included in a Resource URI in the request.

Herein, the expression "a required API version for the service" (or, for example, the expression "an API version required to the first NF node") can mean that the API version is required to be able to (e.g. receive and) process the service request that is transmitted by the first NF node. An NF node having the API version can process the service request encoded by the first NF node.

The SCP can then search for a second NF node that provides the service of the required API version, and can transmit the service request to the second NF node to process the service request. In response, the SCP can receive a response from the second NF node. The response from the second NF node can be transmitted from the SCP to the first NF node. Thus, the first NF node can receive the response from the SCP. In some cases, there may be no such second NF node that provides the service of the required API version.

In an exemplary embodiment of the present disclosure, the method 700 may further comprise step S720. In step S720 of FIG. 6, the first NF node may receive, from the SCP, a response including an error message indicating that no second NF node provides the required API version for the service.

In an exemplary embodiment of the present disclosure, if there is no second NF node that provides the service of the required API version, the SCP may search for another second NF node that provides the service but has an API version different from the required API version. If there is such a second NF node that provides the service of a different API version, the SCP may provide information on the different API version to the first NF node. Therefore, in some embodiments, the response from the SCP can further include information on an API version for the service of at least one second NF node that provides an API version different from the required API version for the service.

In an exemplary embodiment of the present disclosure, the method 700 may further comprise step S730. In step S730 of FIG. 6, the first NF node may construct a different request for the service by changing the required API version. The first NF node, when it receives a response including an error message indicating that no second NF node provides the required API version for the service, can retry a service request by changing the API version.

In an exemplary embodiment of the present disclosure, the first NF node may construct a different request for the service by taking the received information on the different API version into account. If the first NF node supports the different API version informed by the SCP, it may construct a different service request using the different API version.

In an exemplary embodiment of the present disclosure, the required API version may only indicate a major version. In these embodiments, only the "major version" may be taken as the required API version.

FIG. 7 illustratively shows a flowchart of a method 800 for processing a service request according to an exemplary embodiment of the present disclosure. In an embodiment, the method 800 may be performed at an SCP.

As shown in FIG. 7, the method 800 may include steps S810 to S860.

In step S810 of FIG. 7, the SCP receives a request for a service from a first NF node. The request includes an indication indicating a required API version for the service (e.g. an API version for the service that is required to the first NF node). The indication (or the required API version indicated by the indication) is other than an API version included in a resource URI in the request.

In another example, in step S810' of FIG. 7, the SCP may receive a request for a service from a first NF node, where no such indication is included in the request. In step S810' of FIG. 7, the SCP may extract an API version from a Resource URI in the request, as a required API version for the first NF node.

In step S820 of FIG. 7, the SCP searches for a second NF node that provides the service of the required API version.

In an exemplary embodiment of the present disclosure, the SCP may transmit, to an NRF, an NF discovery request for discovering a second NF node that provides the service of the required API version. Thus, the NRF can receive the NF discovery request from the SCP.

In an exemplary embodiment of the present disclosure, the SCP may search in its cache (or memory) for the second NF node that provides the service of the required API version.

In an exemplary embodiment of the present disclosure, there may be no such second NF node that provides the service of the required API version. In this case, the method 800 may further comprise step S830. In step S830 of FIG. 7, the SCP may transmit a response to the first NF node, including an error message indicating that no second NF node provides the required API version for the service. Thus, the first NF node can receive the response from the SCP.

In an exemplary embodiment of the present disclosure, if there is no such second NF node that provides the service of the required API version, the method 800 may further comprise step S840. In step S840 of FIG. 7, the SCP may search for at least one second NF node that provides the service of an API version different from the required API version. If such a second NF node is found, the method 800 may further comprise step S850. In step S850 of FIG. 7, the SCP may include information on the different API version for the service of the at least one second NF node, if any, in the response to the first NF node. The method 800 may further comprise step S860. In step S860 of FIG. 7, the SCP may extract the information on the different API version from a profile of the at least one second NF node. If the first NF node supports the different API version informed by the SCP, the first NF node may construct a different service request using the different API version.

In an exemplary embodiment of the present disclosure, the required API version may only indicate a major version. In these embodiments, only the "major version" may be taken as the required API version.

Figure 8:
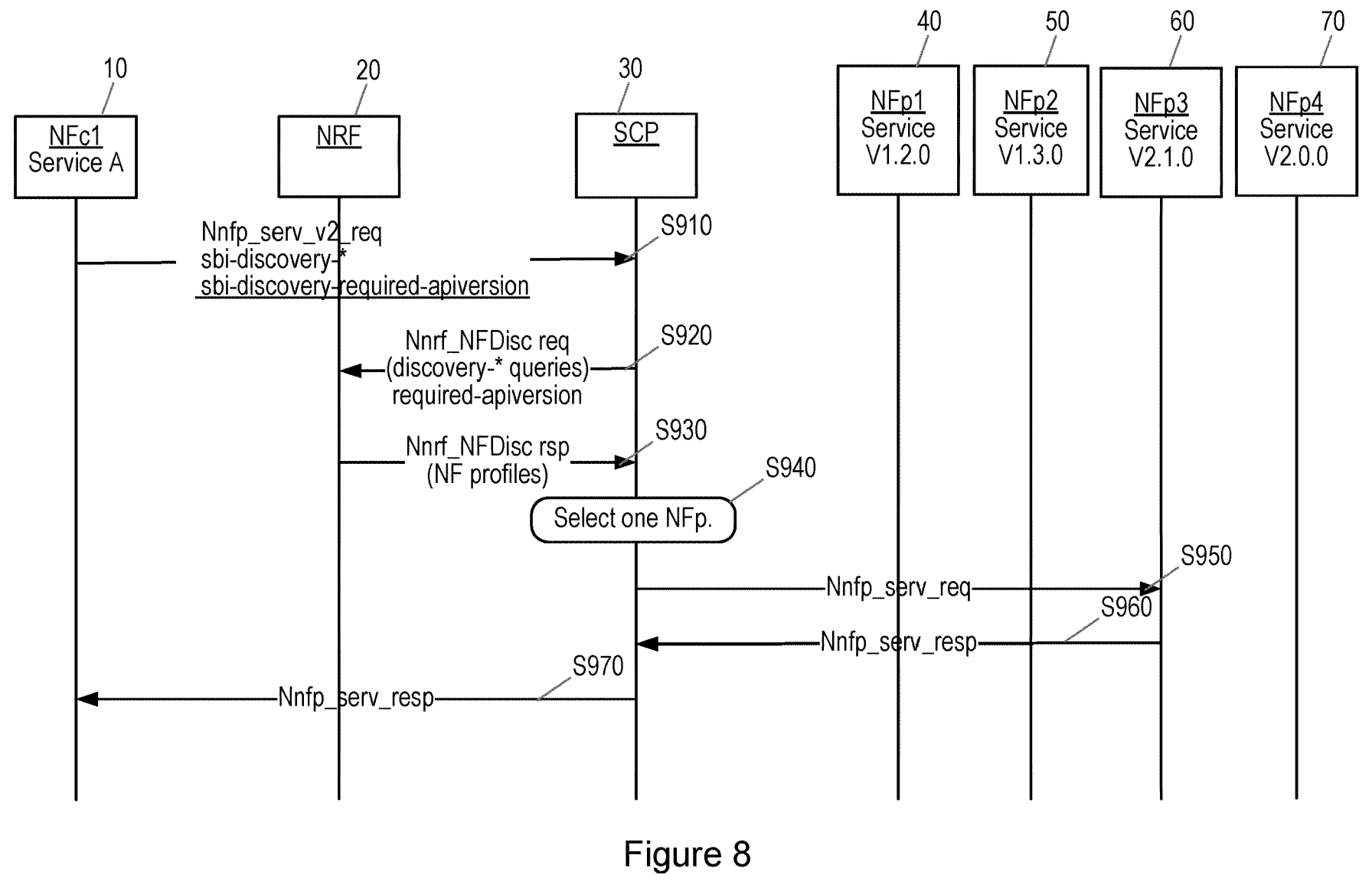

FIG. 8 shows an exemplifying signaling diagram illustrating details of the methods schematically illustrated in FIGS. 6 and 7.

The example shown in FIG. 8 involves an NFc1 10, which is an NF service consumer, an NRF 20, an SCP 30, and NF service producers 40, 50, 60, 70 (i.e. NFp1 40, NFp2 50, NFp3 60, and NFp4 70). In the example illustrated in FIG. 8, NFp1 40 provides v1.2.0 of the service, NFp2 50 provides v1.3.0 of the service, NFp3 60 provides v2.1.0 of the service, and NFp4 70 provides v2.0.0 of the service. FIG. 8 is only an example, and it is known that the number of the NF service producers and the services provided by the NF service producers are shown only for illustration, and that other numbers of NF service producers and/or services is possible.

In step S910 of FIG. 8, the NFc1 10 transmits a service request to the SCP 30. Thus, the SCP 30 can receive the service request from the NFc1 10. In some embodiments, a new sbi-discovery-required-apiversion header can be included in the service request. This header can include the API-version(s) required for the NF service producer to be able to successfully process an encoded JSON body of the request. That is, the API-version can include all the BC (backward compatible) versions with the one (version) that is selected for encoding the request. Therefore, the SCP 30 can be provided with information of required API-version (s). For the purposes of the example illustrated in FIG. 8, the service request can be considered to be encoded with version 2.1.0, and this version is BC with v2.0.0. This encoding is not BC with version 1.x.y (i.e. any version where 1 is the major). Step S910 of FIG. 8 is an example of step S710 shown in FIG. 6 and step S810 shown in FIG. 7.

In step S920 of FIG. 8, the SCP 30 may transmit a discovery request towards the NRF 20. Thus, the NRF can receive the discovery request from the SCP 30. The SCP 30 can perform an NRF Discovery using the (new) information (of API-version(s)) as input. In step S920 of FIG. 8, the (new) information can be comprised in the discovery request. As an alternative, NRF results may be cached (e.g. stored) in the SCP 30, and the SCP 30 may search in its cache (or memory) using the (new) information (of API-version(s)) as an input. Step S920 of FIG. 8 is an example of step S820 shown in FIG. 7.

In step S930 of FIG. 8, the NRF 20 may provide corresponding profiles (e.g. to the SCP 30, in response to the discovery request). Thus, the SCP 30 can receive the corresponding profiles from the NRF 20. In the example illustrated in FIG. 8, the corresponding profiles can be those associated with NFp3 60 and NFp4 70. In step S940 of FIG. 8, the SCP 30 may select one NF service producer, e.g. NFp3 60. In any case, all the provided NF service producers support the service request.

In step S950 of FIG. 8, the SCP 30 may transmit the service request to the selected NF service producer, i.e., NFp3 60. Thus, the selected NF service producer, i.e. NFp3 60, can receive the service request from the SCP 30.

In the example illustrated in FIG. 8, NFp3 60 is able to process the request. Accordingly, in step S960 of FIG. 8, the SCP 30 may receive a service response from NFp3 60, indicating successful processing of the service request.

In step S970 of FIG. 8, the SCP 30 may forward the successful service response to the NFc1 10. Thus, the NFc1 10 can receive the successful service response from the SCP 30.

Figure 9:
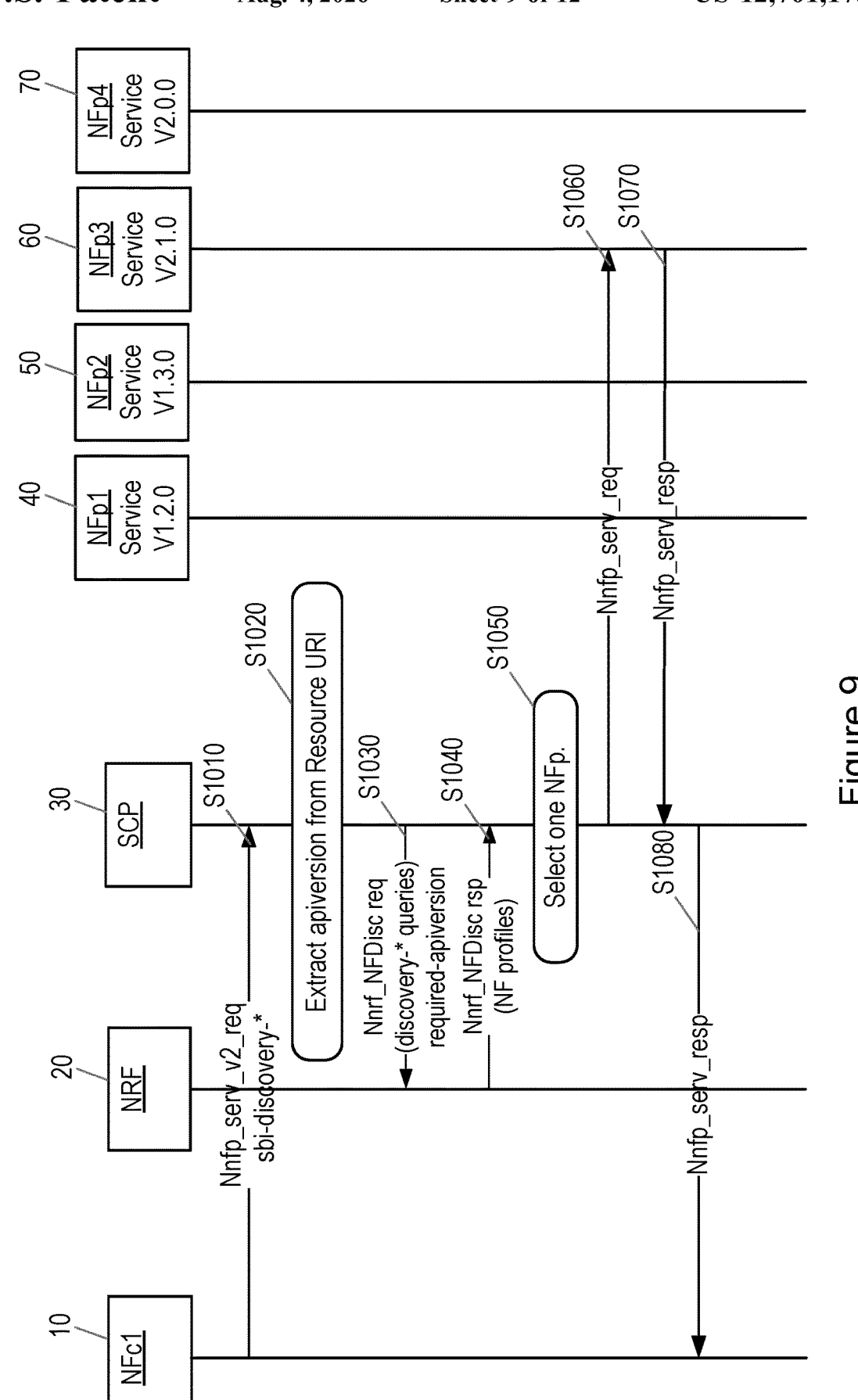
FIG. 9 shows another exemplifying signaling diagram illustrating details of the methods schematically illustrated in FIGS. 6 and 7.

FIG. 9 shows another exemplifying signaling diagram illustrating details of the methods schematically illustrated in FIGS. 6 and 7.

The example shown in FIG. 9 involves an NFc1 10, which is an NF service consumer, an NRF 20, an SCP 30, and NF service producers 40, 50, 60, 70 (i.e. NFp1 40, NFp2 50, NFp3 60, and NFp4 70). In the example illustrated in FIG. 8, NFp1 40 provides v1.2.0 of the service, NFp2 50 provides v1.3.0 of the service, NFp3 60 provides v2.1.0 of the service, and NFp4 70 provides v2.0.0 of the service. FIG. 9 is only an example, and it is known that the number of the NF service producers and the services provided by the NF service producers are shown only for illustration, and that other numbers of NF service producers and/or services is possible.

In step S1010 of FIG. 9, the NFc1 10 transmits a service request to the SCP 30. Thus, the SCP 30 can receive the service request from the NFc1 10. In some embodiments, the request may not include any new information, nor a preferred-api-version header.

In step S1020 of FIG. 9, the SCP 30 may extract an api version from a Resource URI. As illustrated in the example of FIG. 9, in some embodiments, this version can be "v2". Step S1020 of FIG. 9 is an example of step S810' shown in FIG. 7.

Steps S1030 to S1080 of FIG. 9 can be described by reference to the steps S920 to S970 of FIG. 8, and therefore detailed explanation is omitted here for simplicity.

Figure 10:
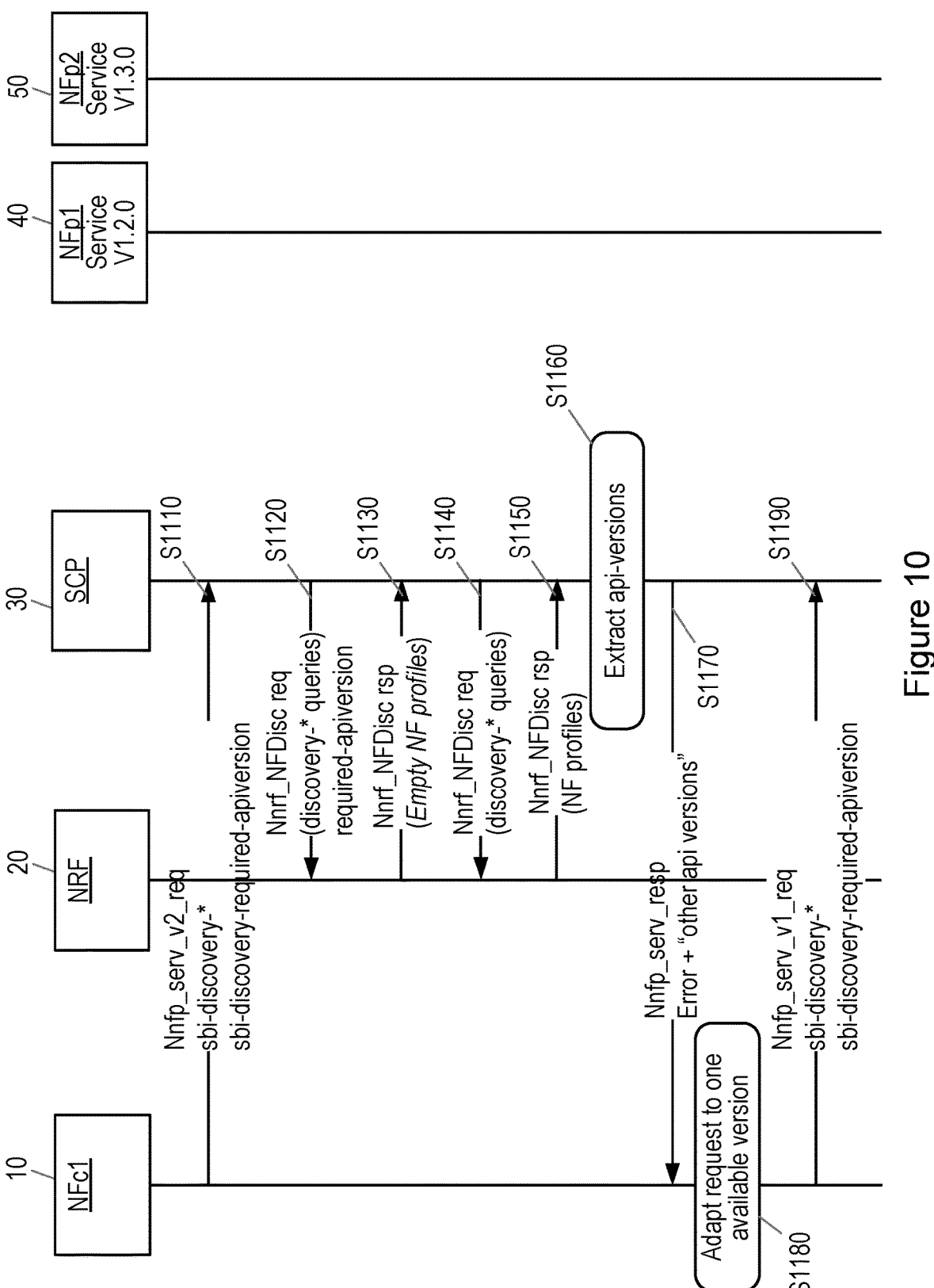
FIG. 10 shows still another exemplifying signaling diagram illustrating details of the methods schematically illustrated in FIGS. 6 and 7.

FIG. 10 shows still another exemplifying signaling diagram illustrating details of the methods schematically illustrated in FIGS. 6 and 7.

The example shown in FIG. 10 involves an NFc1 10, which is an NF service consumer, an NRF 20, an SCP 30, and NF service producers 40, 50 (i.e. NFp1 40 and NFp2 50). In the example illustrated in FIG. 10, NFp1 40 provides v1.2.0 of the service, and NFp2 50 provides v1.3.0 of the service. FIG. 10 is only an example, and it is known that the number of the NF service producers and the services provided by the NF service producers are shown only for illustration, and that other numbers of NF service producers and/or services is possible.

In step S1110 of FIG. 10, the NFc1 10 transmits a service request to the SCP 30. Thus, the SCP 30 can receive the service request from the NFc1 10. In some embodiments, a new sbi-discovery-required-apiversion header can be included in the service request. In some embodiments, this header can include an API-version(s) required for the NF service producer to be able to successfully process an encoded JSON body of the request. That is, the API-version may include all BC (backward compatible) versions that are BC with the one (version) that is selected for encoding the request. Therefore, the SCP 30 can be provided with information of required API-version(s). For the purpose of the example illustrated in FIG. 10, the service request can be encoded with version 2.1.0. Version 2.1.0 can, for example, be BC with v2.0.0. Version 2.1.0 may not, for example, be BC with version 1.x.y. Step S1110 of FIG. 10 is an example of step S710 shown in FIG. 6 and step S810 shown in FIG. 7.

In step S1120 of FIG. 10, the SCP 30 may transmit a discovery request towards the NRF 20. Thus, the NRF 20 can receive the discovery request from the SCP 30. The SCP 30 can perform an NRF Discovery using the (new) information as input. The information can be comprised in the discovery request. As an alternative, the NRF results may be cached (or stored) in the SCP 30, and the SCP 30 may search in its cache (or memory) using the (new) information as an input. Step S1120 of FIG. 10 is an example of step S820 shown in FIG. 7.

As shown in the example illustrated in FIG. 10, in some embodiments, no NF service producer that provides version 2 of the service may be found. In step S1130 of FIG. 10, the NRF 20 may transmit, towards the SCP 30, a discovery response indicating that no NF profile is found. Thus, the SCP 30 can receive the discovery response from the NRF 20.

In step S1140 of FIG. 10, in some embodiments, the SCP 30 may resend the NF discovery request without the new "required-apiversion" query. Step S1140 of FIG. 10 is an example of step S840 shown in FIG. 7.

As shown in the example illustrated in FIG. 10, in some embodiments, some profiles can be found. In the example illustrated by FIG. 10, NFp1 40 and NFp2 50 may be qualified (e.g. assuming that they fulfil all the other discovery parameters). In step S1150 of FIG. 10 the NRF 20 may provide the profiles of NFp1 40 and NFp2 50. Thus, the SCP 30 can receive the profiles of NFp1 40 and NFp2 50 from the NRF 20.

In step S1160 of FIG. 10, the SCP 30 may extract the api-versions from the provided NF service producer profiles (e.g. that are functionally valid but does not fulfil the required-apiversion). Step S1160 of FIG. 10 is an example of step S860 shown in FIG. 7.

In the example illustrated in FIG. 10, a new error response can be defined, to indicate there is no valid result for the "required-apiversions". As extra information, the error response may include any other api-version that fulfils functional requirements, but not the "required-version". In step S1170 of FIG. 10, the SCP 30 may transmit a response to the NFc1 10. Thus, the NFc1 10 can receive the response from the SCP 30. The response transmitted by the SCP 30 to the NFc1 10 can include information on v1.

In step S1180 of FIG. 10, based on the error received, the NFc1 10 can know there is no valid result for the "required-apiversions", and also that there are available versions. If the available versions are supported, the NFc1 10 is able to adapt the encoded service request on available versions, i.e., from v2 to v1.

Step S1190 of FIG. 10 is similar to step S910 in FIG. 8, where the NFc1 10 may transmit a service request with v1 as the required API version in the sbi-discovery-required-apiversion header. The subsequent steps illustrated in FIG. 8 can also apply to the method illustrated in FIG. 10, that is, the request can be successfully executed.

Figure 11:
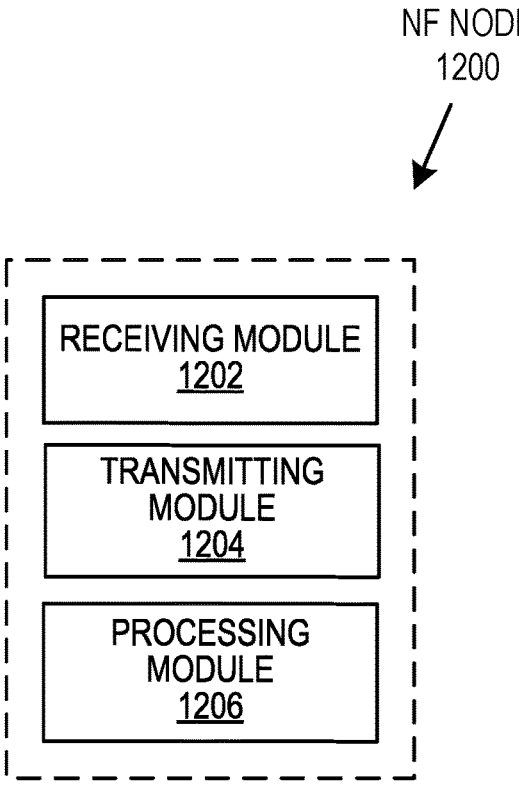
FIG. 11 illustratively shows a schematic structure diagram of a first NF node according to an exemplary embodiment of the present disclosure.

Hereinafter, a structure of a first NF node will be described with reference to FIG. 11. FIG. 11 illustratively shows a schematic structure diagram of a first NF node 1200 (e.g. NFc1 10 as shown in FIGS. 8 to 10, as described previously) according to an exemplary embodiment of the present disclosure. The first NF node 1200 in FIG. 11 may perform the method 700 for requesting a service described previously with reference to FIG. 6. Accordingly, some detailed description on the first NF node 1200 may refer to the corresponding description of the method 700 for requesting a service as previously discussed.

As shown in FIG. 11, the first NF node 1200 may include a receiving module 1202, a transmitting module 1204, and a processing module 1206. As will be understood by the person skilled in the art, common components in the first NF node 1200 are omitted in FIG. 11 for not obscuring the idea of the present disclosure. Also, some modules may be distributed in more modules or integrated into fewer modules. For example, the receiving module 1202 and the transmitting module 1204 may be integrated into a transceiver module.

In an exemplary embodiment of the present disclosure, the transmitting module 1204 of the first NF node 1200 may be configured to transmit a request for the service to an SCP. The request comprises at least an indication indicating a required API version for the service (e.g. an API version for the service that is required to the first NF node). The indication (or the required API version indicated by the indication) is other than an API version included in a Resource URI in the request.

The SCP may then search for a second NF node that provides the service of the required API version. The SCP may transmit the service request to the second NF node to process the service request, and in response may receive a response from the second NF node, which response may be transmitted to the first NF node. In some cases, there may be no such second NF node that provides the service of the required API version.

In an exemplary embodiment of the present disclosure, the receiving module 1202 of the first NF node 1200 may be configured to receive, from the SCP, a response including an error message indicating that no second NF node provides the required API version for the service.

In an exemplary embodiment of the present disclosure, if there is no second NF node that provides the service of the required API version, the SCP may search for another second NF node that provides the service but has an API version different from the required API version. If there is such a second NF node that provides the service of a different API version, the SCP may provide information on the different API version to the first NF node. In this example, the response from the SCP can further include information on an API version for the service of at least one second NF node that provides an API version different from the required API version for the service.

In an exemplary embodiment of the present disclosure, the processing module 1206 of the first NF node 1200 may be configured to construct a different request for the service by changing the required API version. The first NF node 1200, after receiving a response including an error message indicating that no second NF node provides the required API version for the service, can retry a service request by changing the API version.

In an exemplary embodiment of the present disclosure, the processing module 1206 of the first NF node 1200 may be configured to construct a different request for the service by taking the received information on the different API version into account. If the first NF node 1200 supports the different API version informed by the SCP, the processing module 1206 of the first NF node 1200 may be configured to construct a different service request using the different API version.

Figure 12:
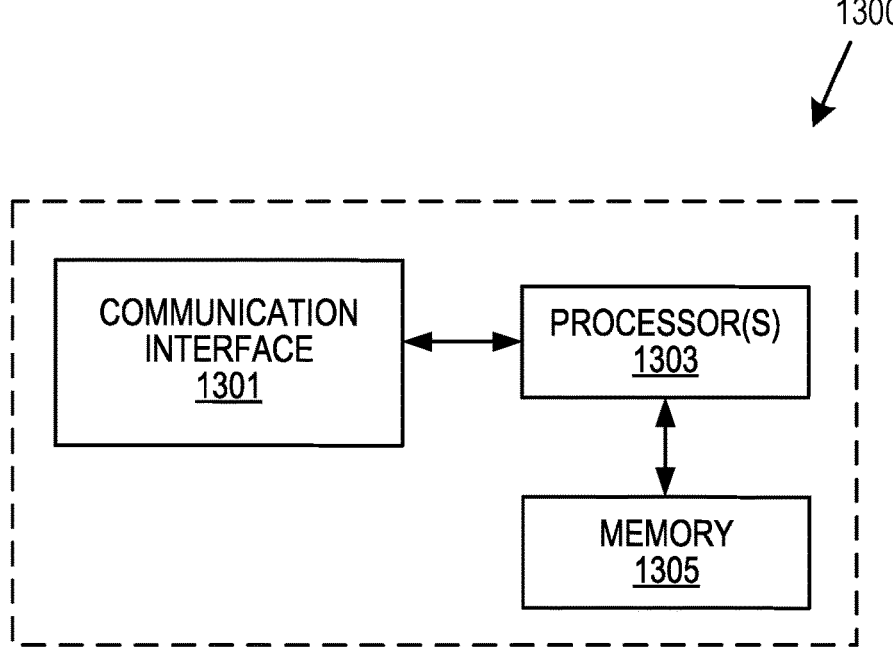
FIG. 12 illustratively shows a schematic structure diagram of a first NF node according to an exemplary embodiment of the present disclosure.

Hereinafter, another structure of a first NF node 1300 will be described with reference to FIG. 12. FIG. 12 illustratively shows a schematic structure diagram of a first NF node 1300 (e.g., NFc1 10 as shown in FIGS. 8 to 10, as described previously) according to an exemplary embodiment of the present disclosure. The first NF node 1300 in FIG. 12 may perform the method 700 for requesting a service described previously with reference to FIG. 6. Accordingly, some detailed description on the first NF node 1300 may refer to the corresponding description of the method 700 for requesting a service as previously discussed.

As shown in FIG. 12, the first NF node 1300 may include at least one controller or processor 1303 including, e.g. any suitable Central Processing Unit (CPU), microcontroller, Digital Signal Processor (DSP), etc., capable of executing computer program instructions. The computer program instructions may be stored in a memory 1305. The memory 1305 may be any combination of a Random Access Memory (RAM) and a Read Only Memory (ROM). The memory may also comprise persistent storage which, for example, can be any single one or combination of magnetic memory, optical memory, or solid state memory or even remotely mounted memory. The exemplary first NF node 1300 further comprises a communication interface 1301 arranged for communication.

The instructions, when loaded from the memory 1305 and executed by the at least one processor 1303, may cause the first NF node 1300 to perform the method 700 for requesting a service as previously discussed.

In particular, in an exemplary embodiment of the present disclosure, the instructions, when loaded from the memory 1305 and executed by the at least one processor 1303, may cause the first NF node 1300 to transmit a request for the service to an SCP. The request comprises at least an indication indicating a required API version for the service (e.g. an Application Program Interface, API, version for the service that is required to the first NF node). The indication (or the required API version indicated by the indication) is other than an API version included in a Resource URI in the request.

The SCP can then search for a second NF node that provides the service of the required API version. The SCP may transmit the service request to the second NF node to process the service request, and in response can receive a response from the second NF node, which response may be transmitted to the first NF node. In some cases, there may be no such second NF node that provides the service of the required API version.

in an exemplary embodiment of the present disclosure, the instructions, when loaded from the memory 1305 and executed by the at least one processor 1303, may cause the first NF node 1300 to receive from the SCP a response including an error message indicating that no second NF node provides the required API version for the service.

In an exemplary embodiment of the present disclosure, if there is no second NF node that provides the service of the required API version, the SCP may search for another second NF node that provides the service but has an API version different from the required API version. If there is such a second NF node that provides the service of a different API version, the SCP may provide information on the different API version to the first NF node. In this example, the response from the SCP can further include information on an API version for the service of at least one second NF node that provides an API version different from the required API version for the service.

In an exemplary embodiment of the present disclosure, the instructions, when loaded from the memory 1305 and executed by the at least one processor 1303, may cause the first NF node 1300 to construct a different request for the service by changing the required API version. The first NF node 1300, after receiving a response including an error message indicating that no second NF node provides the required API version for the service, can retry a service request by changing the API version.

In an exemplary embodiment of the present disclosure, the instructions, when loaded from the memory 1305 and executed by the at least one processor 1303, may cause the first NF node 1300 to construct a different request for the service by taking the received information on the different API version into account. If the first NF node 1300 supports the different API version informed by the SCP, the first NF node 1300 may be configured to construct a different service request using the different API version.

Figure 13:
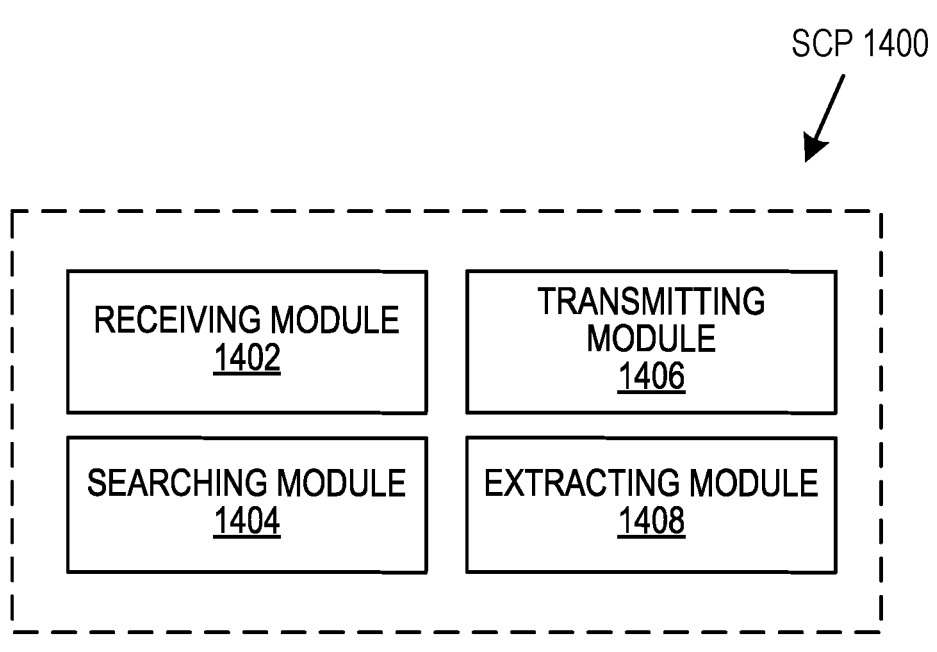
FIG. 13 illustratively shows a schematic structure diagram of a SCP according to an exemplary embodiment of the present disclosure.

Hereinafter, a structure of an SCP will be described with reference to FIG. 13. FIG. 13 illustratively shows a schematic structure diagram of an SCP 1400 (e.g. SCP as shown in FIGS. 8 to 10, as described previously) according to an exemplary embodiment of the present disclosure. The SCP 1400 in FIG. 13 may perform the method 800 for processing a service request described previously with reference to FIG. 7. Accordingly, some detailed description on the SCP 1400 may refer to the corresponding description of the method 800 for processing a service request as previously discussed.

As shown in FIG. 13, the SCP 1400 may include a receiving module 1402, a searching module 1404, a transmitting module 1406, and an extracting module 1408. As will be understood by the person skilled in the art, common components in the SCP 1400 are omitted in FIG. 13 for not obscuring the idea of the present disclosure. Also, some modules may be distributed in more modules or integrated into fewer modules. For example, the receiving module 1402 and the transmitting module 1406 may be integrated into a transceiver module.

In an exemplary embodiment of the present disclosure, the receiving module 1402 of the SCP 1400 may be configured to receive a request for a service from a first NF node, the request including an indication indicating a required API version for the service (e.g. an API version for the service that is required to the first NF node). The indication (or the required API version indicated by the indication) is other than an API version included in a resource URI in the request.

In another example, the receiving module 1402 of the SCP 1400 may be configured to receive a request for a service from a first NF node, where no such indication is included in the request. The extracting module 1408 of the SCP 1400 may be configured to extract an API version from a Resource URI in the request, as a required API version for the first NF node.

In an exemplary embodiment of the present disclosure, the searching module 1404 of the SCP 1400 may be configured to search for a second NF node that provides the service of the required API version.

In an exemplary embodiment of the present disclosure, the searching module 1404 of the SCP 1400 may be configured to transmit (e.g. by means of the transmitting module 1406), to an NRF, an NF discovery request for discovering a second NF node that provides the service of the required API version.

In an exemplary embodiment of the present disclosure, the searching module 1404 of the SCP 1400 may be configured to search in its cache for the second NF node that provides the service of the required API version.

In an exemplary embodiment of the present disclosure, there may be no such second NF node that provides the service of the required API version. In this case, the transmitting module 1406 of the SCP 1400 may be configured to transmit a response to the first NF node, including an error message indicating that no second NF node provides the required API version for the service.

In an exemplary embodiment of the present disclosure, if there is no such second NF node that provides the service of the required API version, the searching module 1404 of the SCP 1400 may be configured to search for at least one second NF node that provides the service of an API version different from the required API version. If such an at least one second NF node is found, the transmitting module 1406 of the SCP 1400 may be configured to transmit the response to the first NF node which includes information on the different API version for the service of the at least one second NF node. In particular, the extracting module 1408 of the SCP 1400 may be configured to extract the information on the different API version from a profile of the at least one second NF node. If the first NF node supports the different API version informed by the SCP, it may construct a different service request using the different API version.

Figure 14:
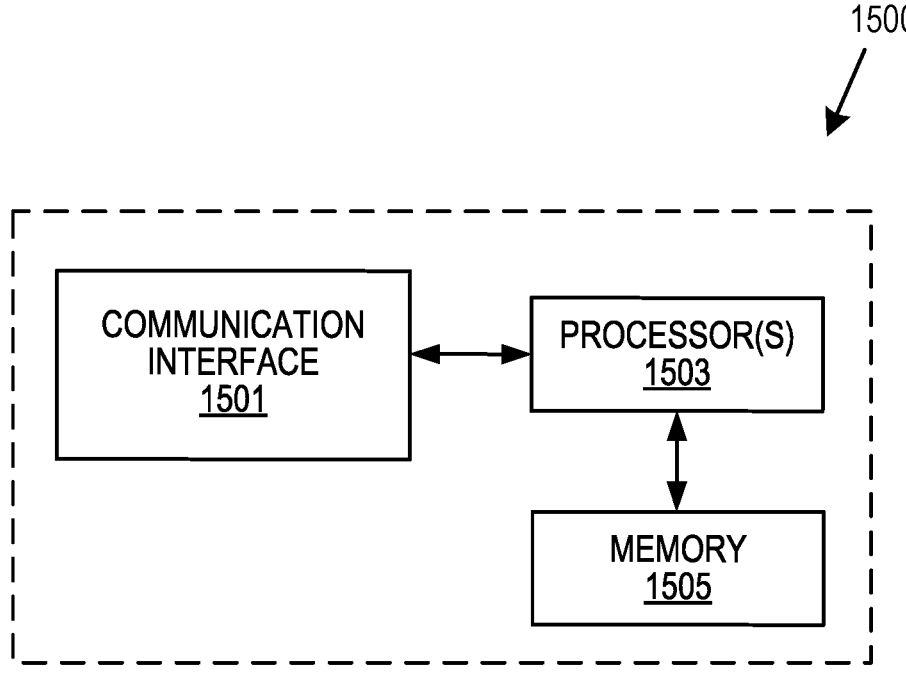
FIG. 14 illustratively shows a schematic structure diagram of a SCP according to an exemplary embodiment of the present disclosure.

Hereinafter, another structure of an SCP will be described with reference to FIG. 14. FIG. 14 illustratively shows a schematic structure diagram of a second NF node SCP 1500 (e.g., SCP as shown in FIGS. 8 to 10, as described previously) according to an exemplary embodiment of the present disclosure. The SCP 1500 in FIG. 14 may perform the method 800 for processing a service request described previously with reference to FIG. 7. Accordingly, some detailed description on the SCP 1500 may refer to the corresponding description of the method 800 for processing a service request as previously discussed.

As shown in FIG. 14, the SCP 1500 may include at least one controller or processor 1503 including, e.g. any suitable Central Processing Unit (CPU) microcontroller, Digital Signal Processor (DSP) etc., capable of executing computer program instructions. The computer program instructions may be stored in a memory 1505. The memory 1505 may be any combination of a RAM and a ROM. The memory may also comprise persistent storage, which, for example, can be any single one or combination of magnetic memory, optical memory, or solid state memory or even remotely mounted memory. The exemplary SCP 1500 further comprises a communication interface 1501 arranged for communication.

The instructions, when loaded from the memory 1505 and executed by the at least one processor 1503, may cause the SCP 1500 to perform the method 800 for processing a service request described previously with reference to FIG. 7.

In particular, in an exemplary embodiment of the present disclosure, the instructions, when loaded from the memory 1505 and executed by the at least one processor 1503, may cause the SCP 1500 to receive a request for a service from a first NF node, the request including an indication indicating a required API version for the service (e.g. an API version for the service that is required to the first NF node). The indication (or the required API version indicated by the indication) is other than an API version included in a resource URI in the request.

In another example, in an exemplary embodiment of the present disclosure, the instructions, when loaded from the memory 1505 and executed by the at least one processor 1503, may cause the SCP 1500 to receive a request for a service from a first NF node, where no such indication is included in the request. The instructions, when loaded from the memory 1505 and executed by the at least one processor 1503, may cause the SCP 1500 to extract an API version from a Resource URI in the request, as a required API version for the first NF node.

In an exemplary embodiment of the present disclosure, the instructions, when loaded from the memory 1505 and executed by the at least one processor 1503, may cause the SCP 1500 to search for a second NF node that provides the service of the required API version.

In an exemplary embodiment of the present disclosure, the instructions, when loaded from the memory 1505 and executed by the at least one processor 1503, may cause the SCP 1500 to transmit, to an NRF, an NF discovery request for discovering a second NF node that provides the service of the required API version.

In an exemplary embodiment of the present disclosure, the instructions, when loaded from the memory 1505 and executed by the at least one processor 1503, may cause the SCP 1500 to search in its cache for the second NF node that provides the service of the required API version.

In an exemplary embodiment of the present disclosure, there may be no such second NF node that provides the service of the required API version. In the case, the instructions, when loaded from the memory 1505 and executed by the at least one processor 1503, may cause the SCP 1500 to transmit a response to the first NF node, including an error message indicating that no second NF node provides the required API version for the service.

In an exemplary embodiment of the present disclosure, if there is no such second NF node that provides the service of the required API version, the instructions, when loaded from the memory 1505 and executed by the at least one processor 1503, may cause the SCP 1500 to search for at least one second NF node that provides the service of an API version different from the required API version. If such an at least one second NF node is found, the instructions, when loaded from the memory 1505 and executed by the at least one processor 1503, may cause the SCP 1500 to transmit the response to the first NF node which includes information on the different API version for the service of the at least one second NF node. In particular, the instructions, when loaded from the memory 1505 and executed by the at least one processor 1503, may cause the SCP 1500 to extract the information on the different API version from a profile of the at least one second NF node. If the first NF node supports the different API version informed by the SCP, it may construct a different service request using the different API version.

Other embodiments of the present disclosure are defined in the following numbered statements:

Statement 1. A method (700) at a first Network Function, NF, node for requesting a service with a Service Communication Proxy, SCP, in model D, comprising:

transmitting (S710) a request for the service to the SCP, the request comprising at least an indication indicating an Application Program Interface, API, version for the service that is required to the first NF node, wherein the indication is other than an API version included in a Resource Uniform Resource Identifier, URI, in the request.

Statement 2. The method of Statement 1, further comprising:

receiving (S720) from the SCP a response including an error message indicating that no second NF node provides the required API version for the service.

Statement 3. The method of Statement 2, wherein the response further includes information on an API version for the service of at least one second NF node that provides an API version different from the required API version for the service.

Statement 4. The method of Statement 3, further comprising:

constructing (S730) a different request for the service by changing the required API version.

Statement 5. The method of Statement 4, wherein constructing a different request for the service is performed by taking the received information on the different API version into account.

Statement 6. The method of any of Statements 1 to 3, wherein the required API version only indicates a major version.

Statement 7. A method (800) at a Service Communication Proxy, SCP, in model D, comprising:

receiving (S810) a request for a service from a first Network Function, NF, node, the request including an indication indicating an Application Program Interface, API, version for the service that is required to the first NF node, wherein the indication is other than an API version included in a Resource Uniform Resource Identifier, URI, in the request; and searching (S820) for a second NF node that provides the service of the required API version.

Statement 8. The method of Statement 7, wherein searching for a second NF node comprises:

transmitting, to a Network Function Repository Function, NRF, a NF discovery request for discovering a second NF node that provides the service of the required API version; or searching in its cache for the second NF node.

Statement 9. The method of Statement 7 or 8, further comprising:

transmitting (S830) a response to the first NF node, including an error message indicating that no second NF node provides the required API version for the service.

Statement 10. The method of Statement 9, further comprising:

searching (S840) for at least one second NF node that provides the service of an API version different from the required API version.

Statement 11. The method of Statement 10, further comprising:

including (S850) information on the different API version for the service of the at least one second NF node, if any, in the response to the first NF node.

Statement 12. The method of Statement 11, further comprising:

extracting (S860) the information on the different API version from a profile of the at least one second NF node.

Statement 13. The method of any of Statements 7 to 12, wherein the required API version only indicates a major version.

Statement 14. A method (800) at a Service Communication Proxy, SCP, in model D, comprising:

receiving (S810') a request for a service from a first Network Function, NF, node;

extracting (S810') an API version from a Resource Uniform Resource Identifier, URI, in the request, as a required API version for the first NF node; and searching (S820) for a second NF node that provides the service of the required API version.

Statement 15. The method of Statement 14, wherein searching for a second NF node comprises:

transmitting, to a Network Function Repository Function, NRF, a NF discovery request for discovering a second NF node that provides the service of the required API version; or searching in its cache for the second NF node.

Statement 16. The method of Statement 14 or 15, further comprising:

transmitting (S830) a response to the first NF node, including an error message indicating that no second NF node provides the required API version for the service.

Statement 17. The method of Statement 16, further comprising:

searching (S840) for at least one second NF node that provides the service of an API version different from the required API version.

Statement 18. The method of Statement 17, further comprising:

including (S850) information on the different API version for the service of the at least one second NF node, if any, in the response to the first NF node.

Statement 19. The method of Statement 18, further comprising:

extracting (S860) the information on the different API version from a profile of the at least one second NF node.

Statement 20. A first Network Function, NF, node (1300) for requesting a service with a Service Communication Proxy, SCP, in model D, comprising:

a communication interface (1301) arranged for communication, at least one processor (1303), and a memory (1305) comprising instructions which, when executed by the at least one processor, cause the first NF node (1300) to:

transmit a request for the service to the SCP, the request comprising at least an indication indicating an Application Program Interface, API, version for the service that is required to the first NF node, wherein the indication is other than an API version included in a Resource Uniform Resource Identifier, URI, in the request.

Statement 21. The first NF node (1300) of Statement 20, wherein the instructions which, when executed by the at least one processor, further cause the first NF node to:

receive from the SCP a response including an error message indicating that no second NF node provides the required API version for the service.

Statement 22. The first NF node (1300) of Statement 21, wherein the response further includes information on an API version for the service of at least one second NF node that provides an API version different from the required API version for the service.

Statement 23. The first NF node (1300) of Statement 22, wherein the instructions which, when executed by the at least one processor, further cause the first NF node to:

construct a different request for the service by changing the required API version.

Statement 24. The first NF node (1300) of Statement 23, wherein the instructions which, when executed by the at least one processor, further cause the first NF node to:

construct a different request for the service by taking the received information on the different API version into account.

Statement 25. The first NF node (1300) of any of Statements 20 to 22, wherein the required API version only indicates a major version.

Statement 26. A Service Communication Proxy, SCP (1500) in model D, comprising:

a communication interface (1501) arranged for communication, at least one processor (1503), and a memory (1505) comprising instructions which, when executed by the at least one processor, cause the SCP (1500) to:

receive a request for a service from a first Network Function, NF, node, the request including an indication indicating an Application Program Interface, API, version for the service that is required to the first NF node, wherein the indication is other than an API version included in a Resource Uniform Resource Identifier, URI, in the request; and search for a second NF node that provides the service of the required API version.

Statement 27. The SCP (1500) of Statement 26, wherein the instructions which, when executed by the at least one processor, further cause the SCP to:

transmit, to a Network Function Repository Function, NRF, a NF discovery request for discovering a second NF node that provides the service of the required API version; or search in its cache for the second NF node.

Statement 28. The SCP (1500) of Statement 26 or 27, wherein the instructions which, when executed by the at least one processor, further cause the SCP to:

transmit a response to the first NF node, including an error message indicating that no second NF node provides the required API version for the service.

Statement 29. The SCP (1500) of Statement 28, wherein the instructions which, when executed by the at least one processor, further cause the SCP to:

search for at least one second NF node that provides the service of an API version different from the required API version.

Statement 30. The SCP (1500) of Statement 29, wherein the instructions which, when executed by the at least one processor, further cause the SCP to:

include information on the different API version for the service of the at least one second NF node, if any, in the response to the first NF node.

Statement 31. The SCP (1500) of any of Statements 26 to 30, wherein the required API version only indicates a major version.

Statement 32. A Service Communication Proxy, SCP (1500), in model D, comprising:

a communication interface arranged for communication, at least one processor, and a memory comprising instructions which, when executed by the at least one processor, cause the SCP to:

receive a request for a service from a first Network Function, NF, node;

extract an API version from a Resource Uniform Resource Identifier, URI, in the request, as a required API version for the first NF node; and search for a second NF node that provides the service of the required API version.

Statement 33. A computer readable storage medium having computer program instructions stored thereon, the computer program instructions, when executed by a processor in a network device, causing the network device to perform the method according to any of Statements 1-19.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the articles "a" and "an" are intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

The invention claimed is:

1. A method performed at a first Network Function (NF) node for requesting a service with a Service Communication Proxy (SCP), the method comprising:

transmitting a request for the service to the SCP, the request comprising at least an indication indicating a required Application Program Interface (API) version for the service, wherein the required API version is other than an API version included in a resource Uniform Resource Identifier (URI) in the request; and receiving from the SCP a response including an error message indicating that no second NF node provides the required API version for the service.

2. The method of claim 1, wherein the response further includes information on an API version for the service of at least one second NF node that provides an API version different from the required API version for the service.

3. The method of claim 2, further comprising constructing a different request for the service by changing the required API version.

4. The method of claim 3, wherein constructing a different request for the service is performed by taking the received information on the different API version into account.

5. The method of claim 1, wherein the required API version only indicates a major version.

6. A method performed at a Service Communication Proxy (SCP), the method comprising:

receiving a request for a service from a first Network Function (NF) node, the request including an indication indicating a required Application Program Interface (API) version for the service, wherein the required API version is other than an API version included in a resource Uniform Resource Identifier (URI) in the request;

searching for a second NF node that provides the service of the required API version; and transmitting a response to the first NF node, including an error message indicating that no second NF node provides the required API version for the service.

7. The method of claim 6, wherein searching for a second NF node comprises:

transmitting, to a Network Repository Function (NRF), an NF discovery request for discovering a second NF node that provides the required API version for the service; or searching in a cache of the SCP for the second NF node.

8. The method of claim 6, further comprising searching for at least one second NF node that provides the service of an API version different from the required API version.

9. The method of claim 8, further comprising including information on the different API version for the service of the at least one second NF node, if any, in the response to the first NF node.

10. The method of claim 9, further comprising extracting the information on the different API version from a profile of the at least one second NF node.

11. The method of claim 6, wherein the required API version only indicates a major version.

12. A method performed at a Service Communication Proxy (SCP), the method comprising:

receiving a request for a service from a first Network Function (NF) node;

extracting an Application Program Interface (API) version from a resource Uniform Resource Identifier (URI) in the request, as a required API version for the service;

searching for a second NF node that provides the service of the required API version; and transmitting a response to the first NF node, including an error message indicating that no second NF node provides the required API version for the service.

13. The method of claim 12, wherein searching for a second NF node comprises:

transmitting, to a Network Repository Function (NRF), an NF discovery request for discovering a second NF node that provides the required API version for the service; or searching in a cache of the SCP for the second NF node.

14. The method of claim 12, further comprising searching for at least one second NF node that provides the service of an API version different from the required API version.

15. The method of claim 14, further comprising including information on the different API version for the service of the at least one second NF node, if any, in the response to the first NF node.

16. The method of claim 15, further comprising extracting the information on the different API version from a profile of the at least one second NF node.

17. A first Network Function (NF) node comprising:

a memory containing instructions; and a processor configured to execute the instructions, whereby processor controls the first NF node to:

transmit a request for a service to a Service Communication Proxy (SCP), the request comprising at least an indication indicating a required Application Program Interface (API) version for the service, wherein the required API version is other than an API version included in a resource Uniform Resource Identifier (URI) in the request; and receive from the SCP a response including an error message indicating that no second NF node provides the required API version for the service.

* * * * *